US012652082B2

(12) United States Patent
Cha et al.

(10) Patent No.: US 12,652,082 B2
(45) Date of Patent: Jun. 9, 2026

(54) ELECTRONIC DEVICE AND METHOD FOR CONTROLLING SETTING OF ANTENNA IN ELECTRONIC DEVICE INCLUDING MULTIPLE ANTENNAS

(71) Applicant: SAMSUNG ELECTRONICS CO., LTD., Suwon-si (KR)

(72) Inventors: Jaemoon Cha, Suwon-si (KR); Kukjeong Kim, Suwon-si (KR); Minha Kim, Suwon-si (KR); Minjae An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 302 days.

(21) Appl. No.: 17/751,157

(22) Filed: May 23, 2022

(65) Prior Publication Data

US 2023/0083784 A1 Mar. 16, 2023

Related U.S. Application Data

(63) Continuation of application No. PCT/KR2022/006294, filed on May 3, 2022.

(30) Foreign Application Priority Data

Aug. 30, 2021 (KR) ........................ 10-2021-0114484

(51) Int. Cl.
*H04B 7/0417* (2017.01)
*H01Q 1/24* (2006.01)

(52) U.S. Cl.
CPC ........... *H04B 7/0417* (2013.01); *H01Q 1/246* (2013.01)

(58) Field of Classification Search
CPC ........ H01Q 1/246; H04B 1/18; H04B 17/102; H04B 17/202; H04B 7/0417; H04B 7/0486

(Continued)

(56) References Cited

U.S. PATENT DOCUMENTS 6,697,634 B1 2/2004 Hayashi
8,971,948 B1 * 3/2015 Breslin .................... H04B 7/04
455/25

(Continued)

FOREIGN PATENT DOCUMENTS

EP 2 765 715 B1 3/2016
EP 2 484 161 B1 3/2019

(Continued)

OTHER PUBLICATIONS

Search Report dated Aug. 5, 2022 in counterpart International Patent Application PCT/KR2022/006294.

(Continued)

*Primary Examiner* — Wen W Huang
(74) *Attorney, Agent, or Firm* — Nixon & Vanderhye P.C.

(57) ABSTRACT

According to various embodiments, an electronic device may include multiple antennas, at least one antenna tuning circuit connected to at least one antenna among the multiple antennas, and at least one communication processor, wherein the at least one communication processor receives, through a first antenna among the multiple antennas, a signal transmitted from a base station based on multiple-input and multiple-output (MIMO), receives, through a second antenna among the multiple antennas, a signal transmitted from the base station based on the MIMO, and when a strength of a first signal received through the first antenna or a strength of a second signal received through the second antenna is equal to or greater than a first threshold value, determines whether an imbalance condition of the first signal and the second signal is satisfied, and adjusts, when the imbalance condition is satisfied, a setting value of the at least one antenna tuning circuit so as to reduce a difference between the strength of the first signal and the strength of the second signal. Various other embodiments are possible.

23 Claims, 19 Drawing Sheets

(58) Field of Classification Search
USPC .................................................. 455/69, 522
See application file for complete search history.

(56)                    References Cited

U.S. PATENT DOCUMENTS

| 2007/0142009 | A1* | 6/2007 | Scarpa | ................. | H04B 7/0871 |
| | | | | | 455/272 |
| 2008/0014891 | A1 | 1/2008 | Jin et al. | | |
| 2008/0062065 | A1* | 3/2008 | Yamamoto | ............ | H01Q 1/243 |
| | | | | | 343/861 |
| 2008/0085739 | A1* | 4/2008 | Kitakado | ................. | H04B 7/08 |
| | | | | | 455/562.1 |
| 2010/0045555 | A1 | 2/2010 | Ryou et al. | | |
| 2011/0207415 | A1* | 8/2011 | Luo | ...................... | H04B 7/0413 |
| | | | | | 455/68 |
| 2011/0299438 | A1* | 12/2011 | Mikhemar | ........... | H04B 1/0458 |
| | | | | | 370/280 |
| 2012/0093090 | A1 | 4/2012 | Han et al. | | |
| 2013/0094543 | A1* | 4/2013 | Zhang | ................. | H04L 25/0204 |
| | | | | | 375/219 |
| 2013/0242794 | A1* | 9/2013 | Liu | ....................... | H04B 7/0404 |
| | | | | | 370/252 |
| 2014/0064350 | A1* | 3/2014 | Krauss | ................. | H04B 7/0857 |
| | | | | | 375/232 |
| 2014/0112422 | A1* | 4/2014 | Zhang | ................. | H04B 7/0865 |
| | | | | | 375/349 |
| 2015/0071335 | A1 | 3/2015 | Breslin et al. | | |
| 2015/0124713 | A1* | 5/2015 | Salhov | ................. | H01Q 3/2605 |
| | | | | | 370/329 |
| 2015/0188599 | A1 | 7/2015 | Shi et al. | | |
| 2015/0230190 | A1 | 8/2015 | Shin et al. | | |
| 2015/0349870 | A1* | 12/2015 | Chen | .................... | H04B 7/0822 |
| | | | | | 375/347 |
| 2016/0127028 | A1* | 5/2016 | Wang | ................... | H04B 7/0877 |
| | | | | | 370/329 |
| 2016/0248496 | A1* | 8/2016 | Bellamkonda | ....... | H04B 7/0413 |
| 2016/0337872 | A1* | 11/2016 | Alrabadi | ............... | H04W 24/02 |
| 2017/0033454 | A1 | 2/2017 | Van Bezooijen et al. | | |
| 2017/0070904 | A1* | 3/2017 | Mali | ...................... | H04W 72/23 |
| 2017/0104549 | A1* | 4/2017 | Wang | ................... | H04B 17/318 |
| 2017/0126288 | A1* | 5/2017 | Sandhu | ................ | H04B 7/0814 |
| 2017/0180062 | A1* | 6/2017 | Johansen | .............. | H04B 17/12 |
| 2017/0272183 | A1* | 9/2017 | Matsuo | ................ | H04B 7/0695 |
| 2018/0026373 | A1* | 1/2018 | Schwent | ................ | H01Q 21/28 |
| | | | | | 343/748 |
| 2018/0062242 | A1* | 3/2018 | Szini | ........................ | H01Q 3/24 |
| 2023/0080162 | A1* | 3/2023 | Ghanbarinejad | ..... | H04W 52/46 |
| | | | | | 455/522 |

FOREIGN PATENT DOCUMENTS

| EP | 3 080 926 B1 | 7/2019 |
| KR | 10-2001-0043342 | 5/2001 |
| KR | 10-2001-0091431 | 10/2001 |
| KR | 10-2007-0117148 | 12/2007 |
| KR | 10-2010-0018243 | 2/2010 |
| KR | 10-2012-0022874 | 3/2012 |
| KR | 10-2012-0054042 | 5/2012 |
| KR | 10-2013-0103555 | 9/2013 |
| KR | 10-2015-0099134 | 8/2015 |
| KR | 10-2018-0030062 | 3/2018 |
| KR | 10-2020-0034251 | 3/2020 |
| WO | 2015/047428 | 4/2015 |

OTHER PUBLICATIONS

Written Opinion dated Aug. 5, 2022 in counterpart International Patent Application PCT/KR2022/006294.
Extended European Search Report dated Oct. 2, 2024 for EP Application No. 22864811.9.
European Office Action dated Jan. 14, 2026 for EP Application No. 22 864 811.9.
Korean Office Action dated Mar. 16, 2026 for KR Application No. 10-2021-0114484.

* cited by examiner

300a

- - - - CONTROL PLANE
———— USER PLANE

300b

- - - - CONTROL PLANE
———— USER PLANE

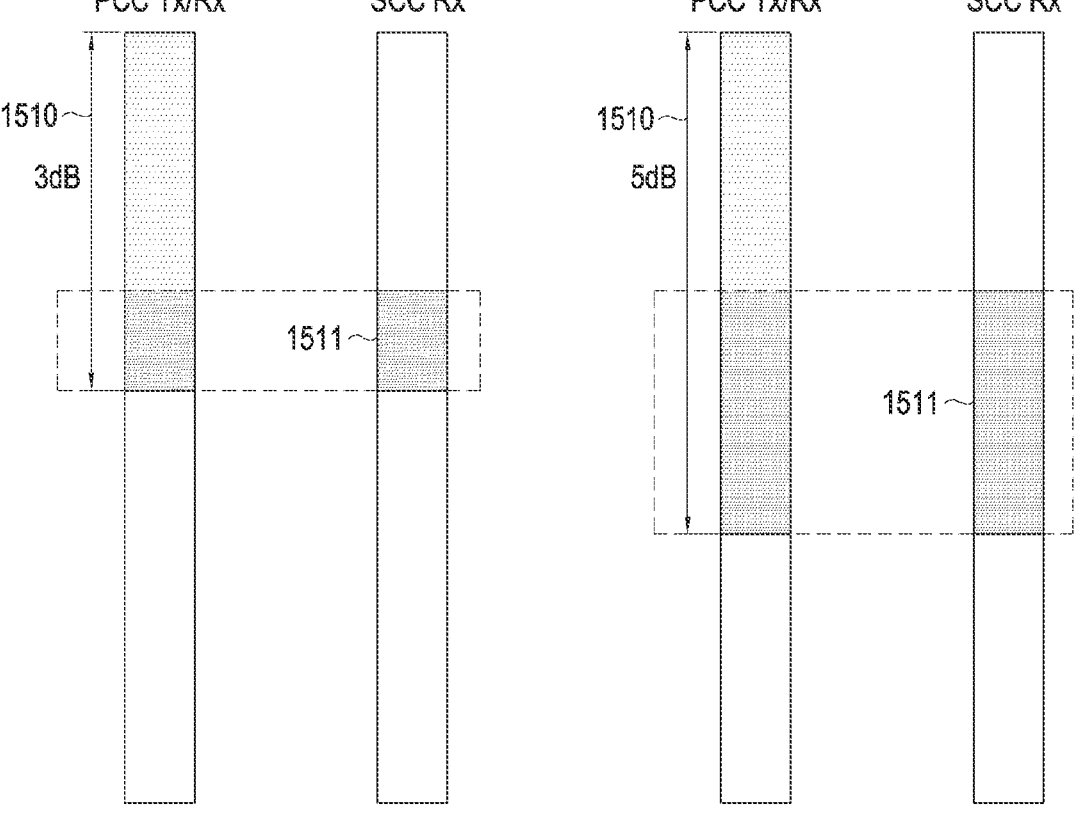
FIG.15A                    FIG.15B

ELECTRONIC DEVICE AND METHOD FOR CONTROLLING SETTING OF ANTENNA IN ELECTRONIC DEVICE INCLUDING MULTIPLE ANTENNAS

CROSS-REFERENCE TO RELATED APPLICATIONS

This application is a continuation of International Application No. PCT/KR2022/006294 designating the United States, filed on May 3, 2022, in the Korean Intellectual Property Receiving Office and claiming priority to Korean Patent Application No. 10-2021-0114484, filed on Aug. 30, 2021, in the Korean Intellectual Property Office, the disclosures of which are incorporated by reference herein in their entireties.

BACKGROUND

Field

The disclosure relate to an electronic device and a method for controlling a setting of an antenna in the electronic device including multiple antennas.

Description of Related Art

As the use of portable terminal providing various functions has recently been popularized with the advance of mobile communication technologies. Accordingly, to meet the demand for wireless data traffic having increased, efforts have been made to develop 5G communication systems. The 5G communication systems are considered to be implemented in higher frequency bands (e.g., 20-60 GHz bands), in addition to the frequency bands used in 3G and long term evolution (LTE) communication systems, so as to accomplish higher data rates.

For example, to decrease path loss of the radio waves and increase the transmission distance in mmWave bands, beamforming, massive multiple-input multiple-output (MIMO), full dimensional MIMO (FD-MIMO), array antenna, analog beam forming, and large scale antenna techniques are being discussed in the 5G communication systems.

In an electronic device, in order to transmit a signal from the electronic device to a communication network (e.g., base station), data generated by a processor or a communication processor may be transmitted to the outside of the electronic device through at least one antenna after the signal is processed via a radio frequency integrated circuit (RFIC) and a radio frequency front end (RFFE) circuit.

In an LTE or 5G communication environment, in order to increase a communication speed and provide high traffic, a heterogeneous network interworking technology (multi-radio access technology (RAT) interworking) (e.g., E-UTRA new radio dual connectivity (EN-DC) or a carrier aggregation (CA) technology may be applied. The total radiation power (TRP) of an electronic device may be expressed as the sum of an antenna gain and a transmission power (Tx power) (e.g., conduction power). An electronic device may adjust transmission performance or reception performance for each frequency of each antenna by changing a setting of an antenna tuning circuit connected to each antenna by an antenna switch controller.

When the electronic device changes the setting of the antenna tuning circuit in consideration of multiple frequency components, such as EN-DC, multiple-input and multiple-output (MIMO), or CA, the overall performance (e.g., throughput; T-PUT) of the electronic device may be deteriorated due to performance imbalance (e.g., imbalance) between multiple reception signals received through at least one antenna. For example, when imbalance occurs between multiple reception signals during an MIMO operation, a reception signal received through a specific path or a specific antenna cannot be normally restored in spite of operating in MIMO, and thus the overall performance of the electronic device may be deteriorated. When an antenna tuner is configured to a value within headroom in a CA or EN-DC situation, although performance of a reception signal corresponding to LTE operating with an anchor or a PCell is relatively excellent, performance of a reception signal corresponding to NR or a low-priority SCell is relatively deteriorated, so that imbalance between reception signals may occur. When imbalance occurs between the reception signals, even if performance of a specific reception signal is excellent, overall performance may be deteriorated.

SUMMARY

Various embodiments of the disclosure may provide an electronic device including multiple antennas, and a method for controlling a setting of an antenna in the electronic device including multiple antennas, wherein even if the electronic device operates in MIMO, and a strength of any one of signals received through the multiple antennas is equal to or greater than a set value, which results good reception performance, when the multiple reception signals satisfy a set imbalance condition, a setting value of an antenna tuning circuit is adjusted.

According to various embodiments, an electronic device may include multiple antennas, at least one antenna tuning circuit connected to at least one antenna among the multiple antennas, and at least one communication processor, wherein the at least one communication processor is configured to receive, through a first antenna among the multiple antennas, a signal transmitted from a base station based on multiple-input and multiple-output (MIMO), receive, through a second antenna among the multiple antennas, a signal transmitted from the base station based on the MIMO, and based on a strength of a first signal received through the first antenna or a strength of a second signal received through the second antenna being equal to or greater than a first threshold value, determine whether an imbalance condition of the first signal and the second signal is satisfied, and adjust, based on the imbalance condition being satisfied, a setting value of the at least one antenna tuning circuit to reduce a difference between the strength of the first signal and the strength of the second signal.

According to various embodiments, a method of operating an electronic device, which corresponds to a method for controlling a setting of an antenna in an electronic device including at least one communication processor, at least one radio frequency integrated circuit (RFIC) connected to the at least one communication processor, and multiple antennas respectively connected to the at least one RFIC via at least one radio frequency front-end (RFFB) circuit or at least one antenna tuning circuit, may include receiving, through a first antenna among the multiple antennas, a signal transmitted from a base station based on multiple-input and multiple-output (MIMO), receiving, through a second antenna among the multiple antennas, a signal transmitted from the base station based on the MIMO, and based on a strength of a first signal received through the first antenna or a strength of a second signal received through the second antenna being equal to or greater than a first threshold value, determining whether an imbalance condition of the first signal and the second signal is satisfied, and adjusting, based on the imbalance condition being satisfied, a setting value of the at least one antenna tuning circuit to reduce a difference between the strength of the first signal and the strength of the second signal.

According to various embodiments, when an electronic device including multiple antennas receives signals transmitted from a base station based on MIMO, even when signals received through at least one antenna are in a good condition, when multiple reception signals satisfy a set imbalance condition, a setting value of an antenna tuning circuit can be adjusted thereby reducing performance degradation due to imbalance and improving overall performance (throughput; T-PUT).

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 15A and FIG. 15B are graphs illustrating a range of a tuning circuit setting value according to a change of headroom for each antenna according to various embodiments.

DETAILED DESCRIPTION

Figure 1:
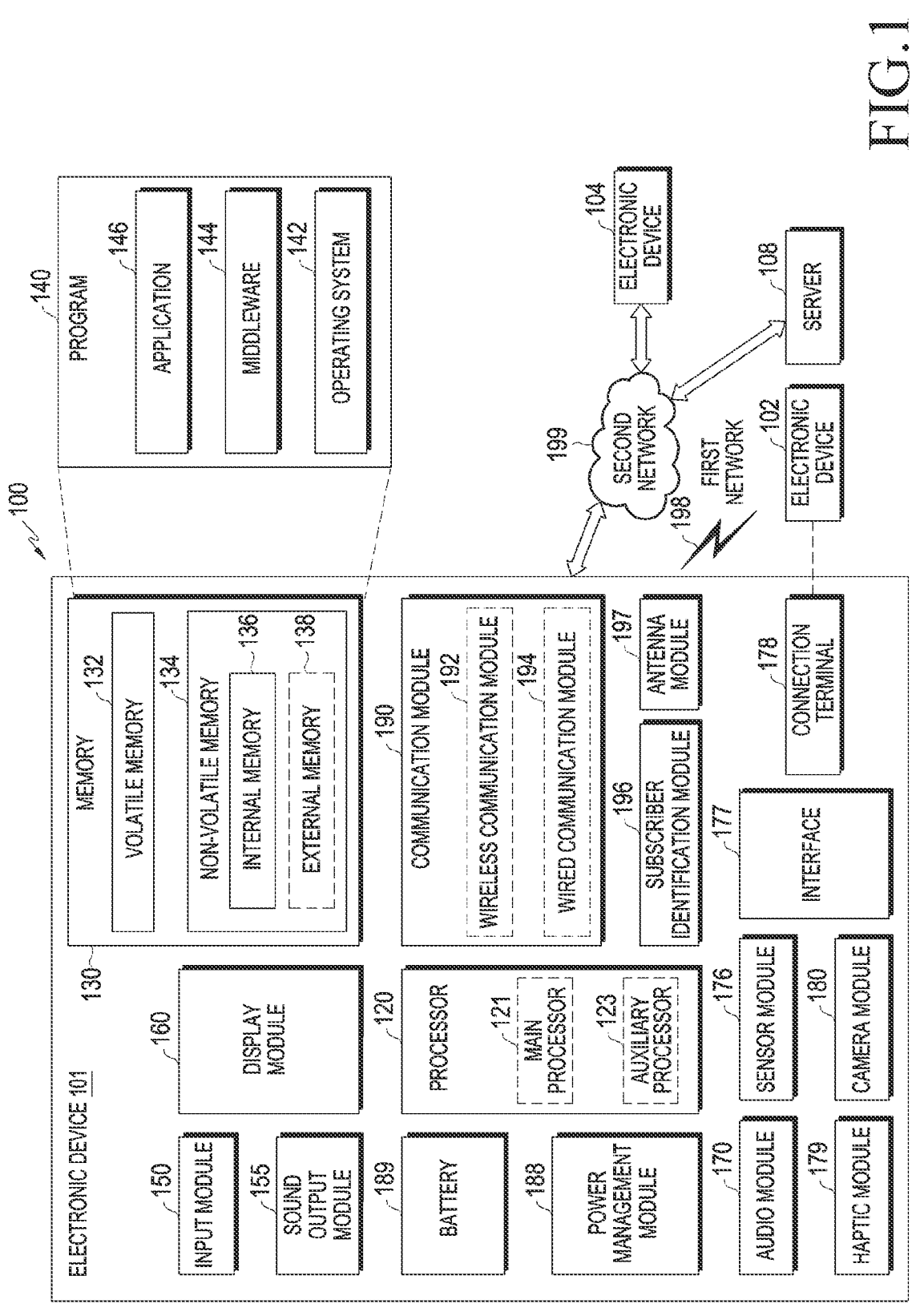
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
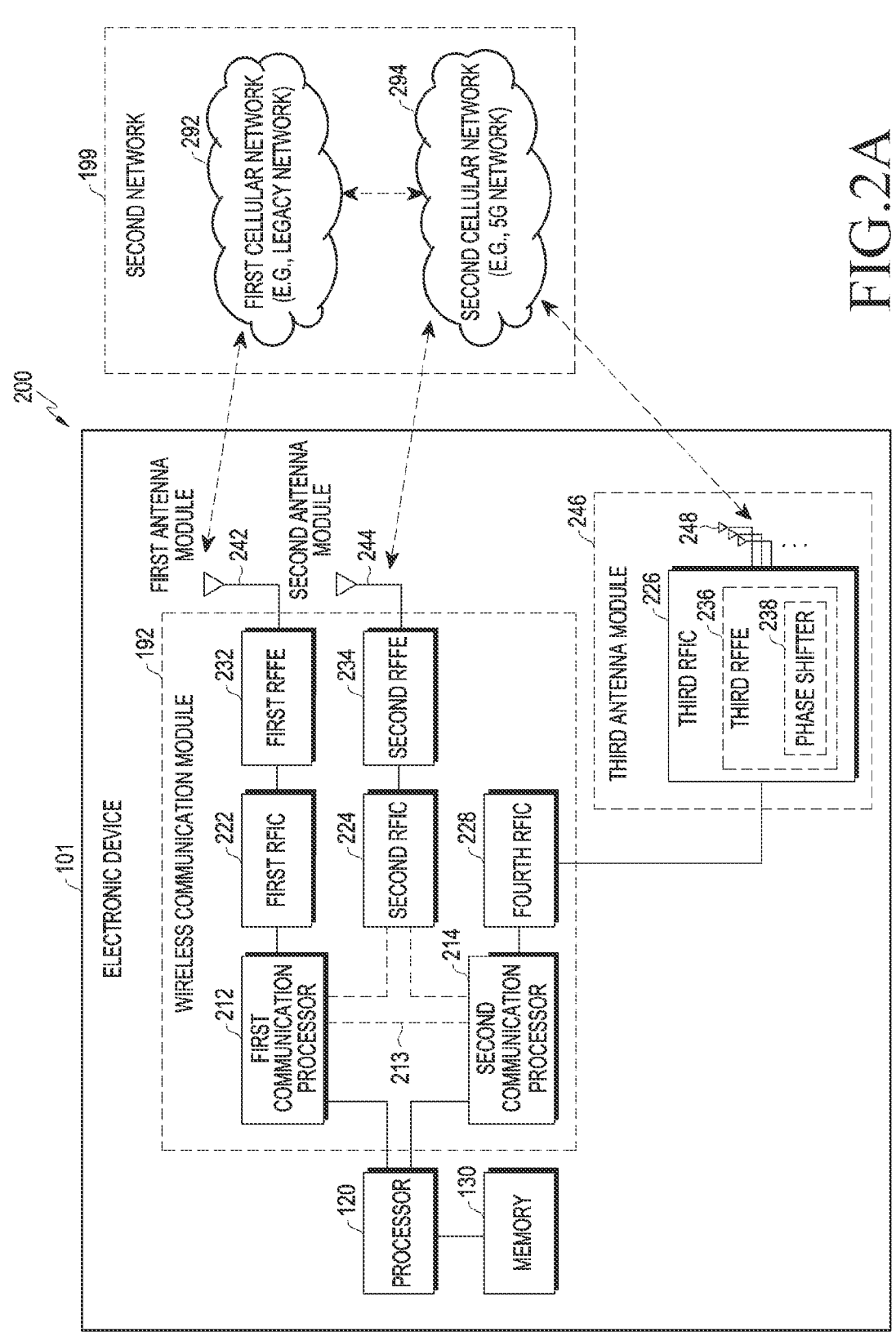
FIG. 2A is a block diagram illustrating the electronic device to support legacy network communication and 5G network communication according to various embodiments.

FIG. 2A is a block diagram 200 illustrating the electronic device 101 to support legacy network communication and 5G network communication according to various embodiments. Referring to FIG. 2A, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor (e.g., including processing circuitry) 120 and a memory 130. The second network 199 may include a first cellular network 292 and a second cellular network 294. According to another embodiment, the electronic device 101 may further include at least one of the components illustrated in FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or may be included as a part of the third RFIC 226.

The first communication processor 212 may include various processing circuitry and support establishment of a communication channel of a band to be used for wireless communication with the first cellular network 292, and legacy network communication via the established communication channel According to various embodiments, the first cellular network may be a legacy network including a second generation (2G), 3G, 4G, or long term evolution (LTE) network. The second communication processor 214 may include various processing circuitry and support establishment of a communication channel corresponding to a designated band (e.g., about 6 GHz to about 60 GHz) among bands to be used for wireless communication with the second cellular network 294, and 5G network communication via the established communication channel. According to various embodiments, the second cellular network 294 may be a 5G network defined by 3GPP. In addition, according to an embodiment, the first communication processor 212 or the second communication processor 214 may support establishment of a communication channel corresponding to another designated band (e.g., about 6 GHz or lower) among the bands to be used for wireless communication with the second cellular network 294, and 5G network communication via the established communication channel.

The first communication processor 212 may transmit data to or receive data from the second communication processor 214. For example, data that has been classified to be transmitted over the second cellular network 294 may be changed to be transmitted over the first cellular network 292. In this case, the first communication processor 212 may receive transmission data from the second communication processor 214. For example, the first communication processor 212 may transmit data or receive data from the second communication processor 214 via an inter-processor interface 213. The inter-processor interface 213 may be implemented as, for example, a universal asynchronous receiver/transmitter (UART) (e.g., high speed (HS)-UART) or a peripheral component interconnect bus express (PCIe) interface, but the type thereof is not limited. Alternatively, the first communication processor 212 and the second communication processor 214 may exchange control information and packet data information by using, for example, a shared memory. The first communication processor 212 may transmit or receive various information to or from the second communication processor 214, the various information including sensing information, information on output strength, and resource block (RB) allocation information.

Depending on implementation, the first communication processor 212 may not be directly connected to the second communication processor 214. In this case, the first communication processor 212 may transmit data to or receive data from the second communication processor 214 via the processor 120 (e.g., application processor). For example, the first communication processor 212 and the second communication processor 214 may transmit or receive data via the processor 120 (e.g., application processor) and an HS-UART interface or a PCIe interface, but the type of the interface is not limited. Alternatively, the first communication processor 212 and the second communication processor 214 may exchange control information and packet data information by using the processor 120 (e.g., application processor) and the shared memory.

Figure 2B:
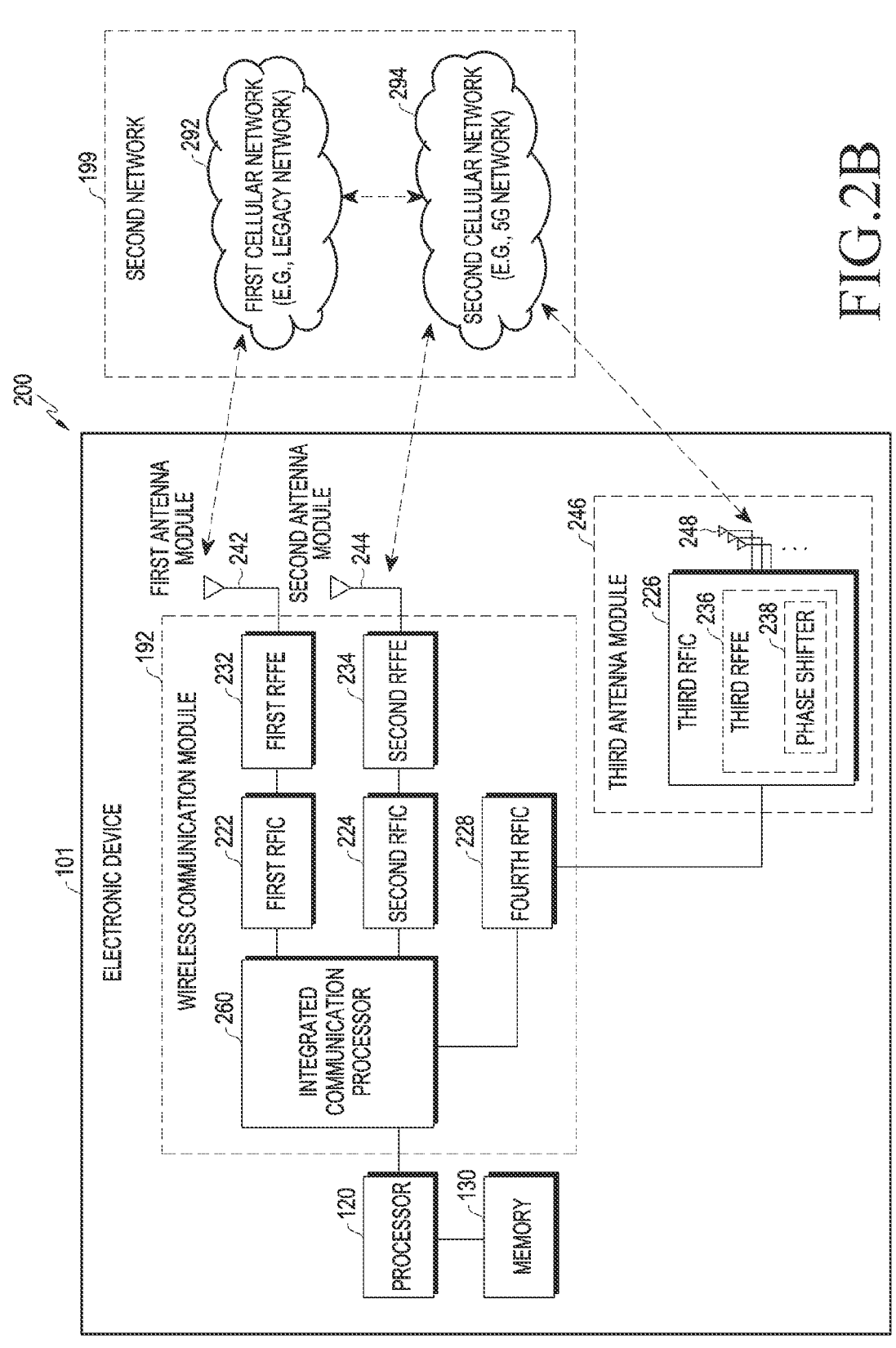
FIG. 2B is a block diagram illustrating the electronic device to support legacy network communication and 5G network communication according to various embodiments.

According to an embodiment, the first communication processor 212 and the second communication processor 214 may be implemented in a single chip or a single package. According to various embodiments, the first communication processor 212 or the second communication processor 214 may be implemented, in a single chip or a single package, together with the processor 120, an auxiliary processor 123, or the communication module 190. For example, as shown in FIG. 2B, an integrated communication processor 260 may support functions for communication with both the first cellular network 292 and the second cellular network 294.

The first RFIC 222 may convert, during transmission, a baseband signal generated by the first communication processor 212 into a radio frequency (RF) signal of about 700 MHz to about 3 GHz used for the first cellular network 292 (e.g., legacy network). During reception, the RF signal may be acquired from the first cellular network 292 (e.g., legacy network) via an antenna (e.g., first antenna module 242) and may be preprocessed via RFFE (e.g., first RFFE 232). The first RFIC 222 may convert the preprocessed RF signal into a baseband signal so as to be processed by the first communication processor 212.

The second RFIC 224 may convert, during transmission, a baseband signal generated by the first communication processor 212 or the second communication processor 214 into an RF signal (hereinafter, a 5G Sub6 RF signal) of a Sub6 band (e.g., about 6 GHz or lower) used for the second cellular network 294 (e.g., 5G network). During reception, the 5G Sub6 RF signal may be acquired from the second cellular network 294 (e.g., 5G network) via an antenna (e.g., second antenna module 244) and may be preprocessed via RFFE (e.g., first RFFE 234). The second RFIC 224 may convert the preprocessed 5G Sub6 RF signal into a baseband signal so as to be processed by a communication processor corresponding to one of the first communication processor 212 or the second communication processor 214.

The third RFIC 226 may convert a baseband signal generated by the second communication processor 214 into an RF signal (hereinafter, 5G Above6 RF signal) of a 5G Above6 band (e.g., about 6 GHz to about 60 GHz) to be used for the second cellular network 294 (e.g., 5G network). During reception, the 5G Above6 RF signal may be acquired from the second cellular network 294 (e.g., 5G network) via an antenna (e.g., antenna 248) and may be preprocessed via the third RFFE 236. The third RFIC 226 may convert the preprocessed 5G Above6 RF signal into a baseband signal so as to be processed by the second communication processor 214. According to an embodiment, the third RFFE 236 may be implemented as a part of the third RFIC 226.

According to an embodiment, the electronic device 101 may include the fourth RFIC 228 separately from or as at least a part of the third RFIC 226. In this case, the fourth RFIC 228 may convert a baseband signal generated by the second communication processor 214 into an RF signal (hereinafter, IF signal) of an intermediate frequency band (e.g., about 9 GHz to about 11 GHz), and then may transfer the IF signal to the third RFIC 226. The third RFIC 226 may convert the IF signal into a 5G Above6 RF signal. During reception, the 5G Above6 RF signal may be received from the second cellular network 294 (e.g., 5G network) via an antenna (e.g., antenna 248) and may be converted to an IF signal by the third RFIC 226. The fourth RFIC 228 may convert the IF signal into a baseband signal so as to be processed by the second communication processor 214.

According to an embodiment, the first RFIC 222 and the second RFIC 224 may be implemented as at least a part of a single package or a single chip. According to various embodiments, in FIG. 2A or FIG. 2B, when implemented as a single chip or a single package, the first RFIC 222 and the second RFIC 224 may be implemented as an integrated RFIC. In this case, the integrated RFIC may be connected to the first RFFE 232 and the second RFFE 234 so as to convert a baseband signal into a signal of a band supported by the first RFFE 232 and/or the second RFFE 234, and the converted signal may be transmitted to one of the first RFFE 232 and the second RFFE 234. According to an embodiment, the first RFFE 232 and the second RFFE 234 may be implemented as at least a part of a single package or a single chip. According to an embodiment, at least one of the first antenna module 242 or the second antenna module 244 may be omitted, or may be combined with another antenna module so as to process RF signals in multiple corresponding bands.

According to an embodiment, the third RFIC 226 and the antenna 248 may be disposed on the same substrate so as to form a third antenna module 246. For example, the wireless communication module 192 or the processor 120 may be disposed on a first substrate (e.g., main PCB). In this case, the third RFIC 226 may be disposed in a partial area (e.g., bottom surface) of a second substrate (e.g., sub-PCB) separate from the first substrate, and the antenna 248 may be disposed in another partial area (e.g., top surface), thereby forming the third antenna module 246. By placing the third RFIC 226 and the antenna 248 on the same substrate, it is possible to reduce the length of a transmission line therebetween. This, for example, may reduce the loss (e.g., attenuation) of a signal, which is caused due to a transmission line, in a high frequency band (e.g., about 6 GHz to about 60 GHz) used for 5G network communication. Accordingly, the electronic device 101 may improve the quality or speed of communication with the second cellular network 294 (e.g., 5G network).

According to an embodiment, the antenna 248 may be formed as an antenna array including multiple antenna elements that may be used for beamforming. In this case, the third RFIC 226 may include, for example, multiple phase shifters 238 corresponding to the multiple antenna elements, as parts of the third RFFE 236. During transmission, each of the multiple phase shifters 238 may convert the phase of a 5G Above6 RF signal to be transmitted to the outside of the electronic device 101 (e.g., base station of a 5G network) via a corresponding antenna element. During reception, each of the multiple phase shifters 238 may convert the phase of the 5G Above6 RF signal received from the outside via the corresponding antenna element, into the same or substantially the same phase. This enables transmission or reception via beamforming between the electronic device 101 and the outside.

The second cellular network 294 (e.g., 5G network) may be operated independently of (e.g., stand-alone (SA) or in connection with (e.g., non-stand alone (NSA)) the first cellular network 292 (e.g., legacy network). For example, the 5G network may have only an access network (e.g., 5G radio access network (RAN) or next generation RAN (NG RAN)) and may not have a core network (e.g., next generation core (NGC)). In this case, the electronic device 101 may access the access network of the 5G network, and then may access an external network (e.g., Internet) under the control of a core network (e.g., evolved packed core (EPC)) of the legacy network. Protocol information (e.g., LTE protocol information) for communication with the legacy network or protocol information (e.g., new radio (NR) protocol information) for communication with the 5G network may be stored in the memory 230 and may be accessed by other components (e.g., processor 120, first communication processor 212, or second communication processor 214).

Figure 3A:
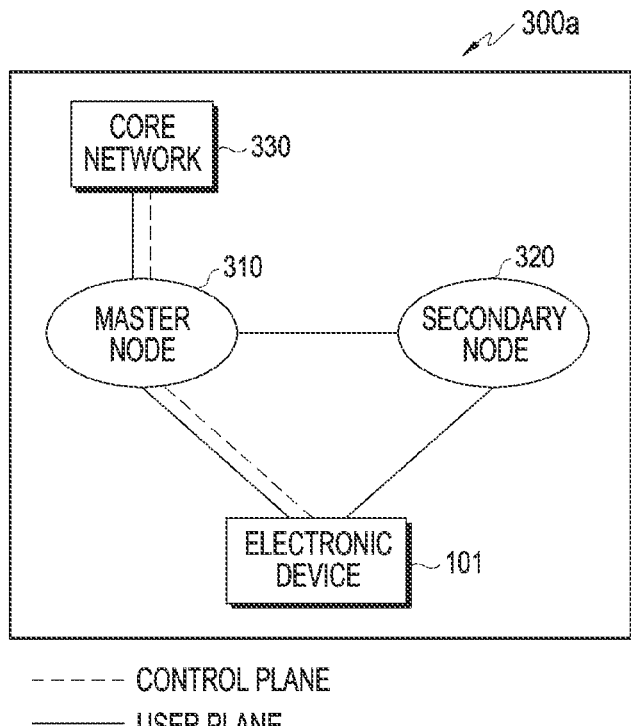
FIG. 3A is a diagram illustrating wireless communication systems that provide networks of legacy communication and/or 5G communication according to various embodiments.
Figure 3B:
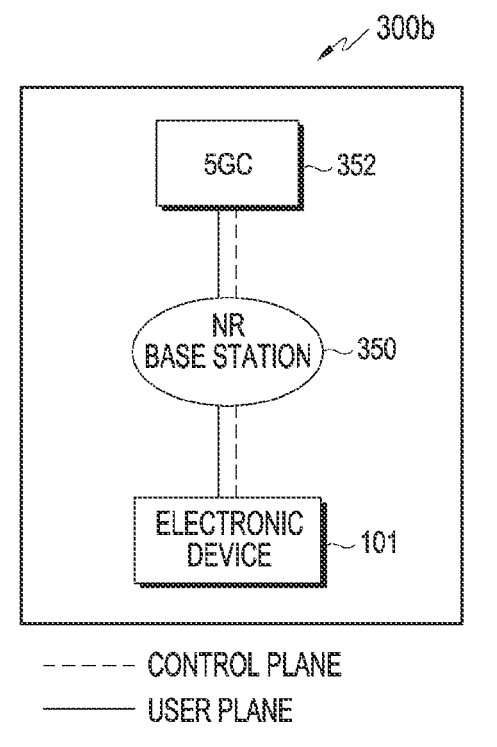
FIG. 3B is a diagram illustrating wireless communication systems that provide networks of legacy communication and/or 5G communication according to various embodiments.
Figure 3C:
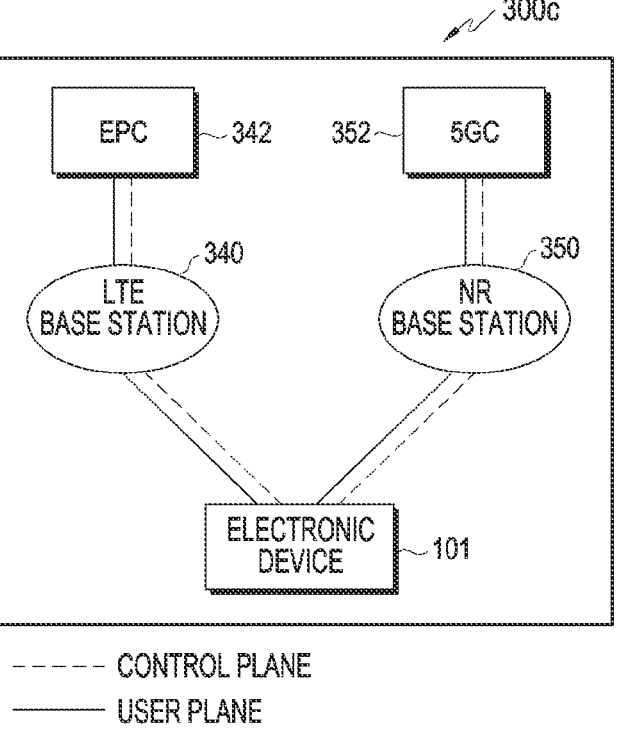
FIG. 3C is a diagram illustrating wireless communication systems that provide networks of legacy communication and/or 5G communication according to various embodiments.

FIG. 3A, FIG. 3B, and FIG. 3C are diagrams illustrating wireless communication systems that provide networks of legacy communication and/or 5G communication according to various embodiments. Referring to FIG. 3A, FIG. 3B, and FIG. 3C, network environments 300a to 300c may include at least one of a legacy network and a 5G network. The legacy network may include, for example, a 4G or LTE base station 340 (e.g., eNodeB (eNB)) of the 3GPP standard supporting a wireless access of the electronic device 101, and an evolved packet core (EPC) 342 which manages 4G communication. The 5G network may include, for example, a new radio (NR) base station 350 (e.g., gNodeB (gNB)) supporting a wireless access of the electronic device 101, and a 5th generation core (5GC) 352 which manages 5G communication of the electronic device 101.

According to various embodiments, the electronic device 101 may transmit or receive a control message and user data through a legacy communication and/or 5G communication. The control message may include a message related to at least one of, for example, security control, bearer setup, authentication, registration, or mobility management of the electronic device 101. The user data may refer to, for example, user data except for a control message transmitted or received between the electronic device 101 and a core network 330 (e.g., EPC 342).

Referring to FIG. 3A, the electronic device 101 according to an embodiment may transmit or receive at least one of a control message or user data to or from at least part (e.g., NR base station 350 and 5GC 352) of the 5G network using at least a part (e.g., LTE base station 340 and EPC 342) of the legacy network.

According to various embodiments, the network environment 300a may include a network environment which provides wireless communication dual connectivity (DC) to the LTE base station 340 and the NR base station 350 and transmits or receives a control message to or from the electronic device 101 through one core network 330 of the EPC 342 or the 5GC 352.

According to various embodiments, in a DC environment, one of the LTE base station 340 and the NR base station 350 may operate as a master node (MN) 310 and the other may operate as a secondary node (SN) 320. The MN 310 may be connected to the core network 330 and transmit or receive a control message to or from the core network 330. The MN 310 and the SN 320 may be connected to each other via a network interface so as to transmit or receive a message related to management of radio resources (e.g., communication channel) to or from each other.

According to various embodiments, the MN 310 may include the LTE base station 340, the SN 320 may include the NR base station 350, and the core network 330 may include the EPC 342. For example, a control message may be transmitted or received via the LTE base station 340 and the EPC 342, and user data may be transmitted or received via at least one of the LTE base station 340 or the NR base station 350.

According to various embodiments, the MN 310 may include the NR base station 350, the SN 320 may include the LTE base station 340, and the core network 330 may include the 5GC 352. For example, a control message may be transmitted or received via the NR base station 350 and the 5GC 352, and user data may be transmitted or received via at least one of the LTE base station 340 or the NR base station 350.

Referring to FIG. 3B, according to various embodiments, the 5G network may include an NR base station 350 and a 5GC 352, and may transmit or receive a control message and user data independently of the electronic device 101.

Referring to FIG. 3C, the legacy network and the 5G network according to various embodiments may transmit or receive data independently of each other. For example, the electronic device 101 and the EPC 342 may transmit or receive a control message and user data via the LTE base station 340. For another example, the electronic device 101 and the 5GC 352 may transmit or receive a control message and user data via the NR base station 350.

According to various embodiments, the electronic device 101 may be registered with at least one of the EPC 342 or the 5GC 352 so as to transmit or receive a control message.

According to various embodiments, the EPC 342 or the 5GC 352 may interwork to manage communication of the electronic device 101. For example, movement information of the electronic device 101 may be transmitted or received via an interface between the EPC 342 and the 5GC 352.

As described above, dual connectivity via the LTE base station 340 and the NR base station 350 may be referred to as E-UTRA new radio dual connectivity (EN-DC).

Hereinafter, structures and operations of the electronic device 101 according to various embodiments will be described in detail with reference to FIG. 4, FIG. 5A, FIG. 5B, FIG. 5C, FIG. 5D, FIG. 6, and FIG. 7. In each drawing of embodiments to be described later, it is illustrated that one communication processor 260 and one RFIC 410 are connected to multiple RFFEs 431, 432, 433, and 611 to 640, but various embodiments to be described later are not limited thereto. For example, in various embodiments to be described later, multiple communication processors 212, 214 and/or multiple RFICs 222, 224, 226, and 228 may be connected to multiple RFFEs 431, 432, 433, and 611 to 640, as also illustrated in FIG. 2A or FIG. 2B.

Figure 4:
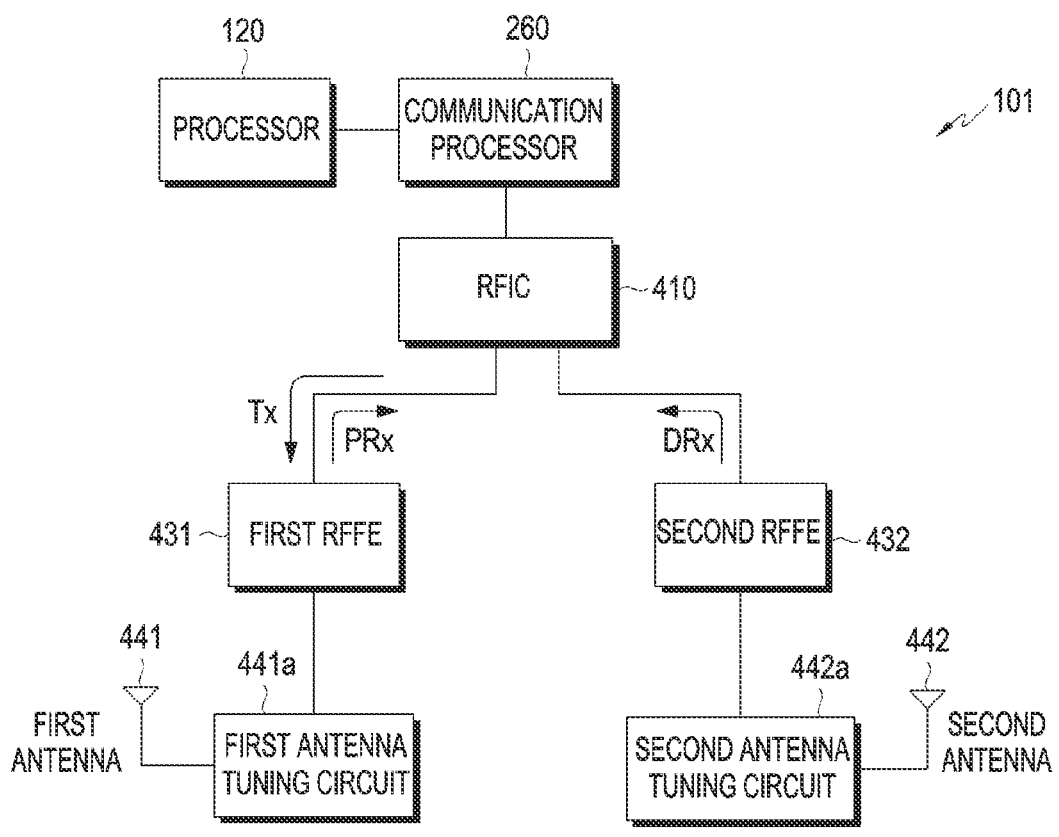
FIG. 4 is a block diagram illustrating the electronic device according to various embodiments.

FIG. 4 is a block diagram illustrating the electronic device according to various embodiments. According to various embodiments, FIG. 4 illustrates an embodiment of the electronic device, wherein the electronic device 101 includes two antennas 441 and 442. Although FIG. 4 illustrates the electronic device including two antennas, the electronic device 101 may include three or more antennas according to various embodiments. For example, when operating in MIMO, the electronic device 101 may receive signals transmitted from a base station through multiple antennas (e.g., two or more antennas) based on the MIMO.

Referring to FIG. 4, an electronic device (e.g., electronic device 101 of FIG. 1) according to various embodiments may include the processor (e.g., including processing circuitry) 120, the communication processor (e.g., including processing circuitry) 260, an RFIC 410, a first RFFE 431, a second RFEE 432, a first antenna 441, a second antenna 442, a first antenna tuning circuit 441a, and/or a second antenna tuning circuit 442a. For example, the first RFFE 431 may be placed in one area within a housing of the electronic device

101, and the second RFFE 432 may be placed in another area spaced apart from the one area within the housing of the electronic device 101, but various embodiments are not limited to locations of the placement.

According to various embodiments, the RFIC 410 may, during transmission, convert a baseband signal generated by the communication processor 260 into a radio frequency (RF) signal used in a communication network. For example, the RFIC 410 may transmit an RF signal used in a first communication network (e.g., 5G network) or a second communication network (e.g., LTE network) to the first antenna 441 via the first RFFE 431 and the first antenna tuning circuit 441a. The RFIC 410 may transmit an RF signal used in the first communication network (e.g., 5G network) or the second communication network (e.g., LTE network) to the second antenna 442 via the second RFFE 432 and the second antenna tuning circuit 442a.

According to various embodiments, the first antenna tuning circuit 441a may be electrically connected to the first antenna 441, and the second antenna tuning circuit 442a may be electrically connected to the second antenna 442. In an embodiment, the communication processor 260 may adjust a setting value of the first antenna tuning circuit 441a and a setting value of the second antenna tuning circuit 442a, thereby adjusting (e.g., tuning) characteristics of a signal (e.g., transmission signal (Tx)) transmitted through each connected antenna and a signal (e.g., reception signal Rx) received transmitted through each connected antenna. A detailed embodiment thereof will be described later with reference to FIG. 5A, FIG. 5B, FIG. 5C, or FIG. 5D.

According to various embodiments, the first antenna 441 may be configured as a first reception antenna (Rx antenna), and the second antenna 442 may be configured as a second reception antenna (Rx antenna). The electronic device 101 may receive signals transmitted from the base station, through the first antenna 441 and/or the second antenna 442, and may decode the same. For example, a signal received through the first antenna 441 is a first Rx signal, and may be transmitted to the communication processor 260 via the first antenna tuning circuit 441a, the first RFFE 431, and the RFIC 410. As another example, a signal received through the second antenna 442 is a second Rx signal, and may be transmitted to the communication processor 260 through the second antenna tuning circuit 442a, the second RFFE 432, and the RFIC 410.

According to various embodiments, when the electronic device 101 operates in MIMO, the electronic device 101 may receive a rank for operation in the MIMO from the base station. The electronic device 101 may receive signals transmitted based on the MIMO from the base station, through the first antenna 441 and the second antenna 442. For convenience of description, a signal received through the first antenna 441 may be referred to as a first signal, and a signal received through the second antenna 442 may be referred to as a second signal.

According to various embodiments, the first RFFE 431 may include at least one duplexer or at least one diplexer so as to process a transmission signal (Tx) and a reception signal (Rx) together. As another example, the second RFFE 432 may include at least one duplexer or at least one diplexer so as to process a transmission signal (Tx) and a reception signal (Rx) together.

FIGS. 5A, 5B, 5C and 5D are diagrams illustrating antenna tuning circuits according to various embodiments.

Figure 5A:
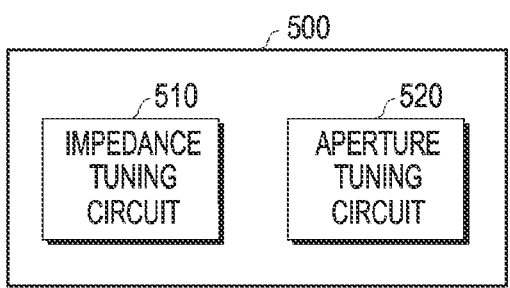
FIG. 5A is a diagram illustrating an antenna tuning circuit according to various embodiments.
Figure 5B:
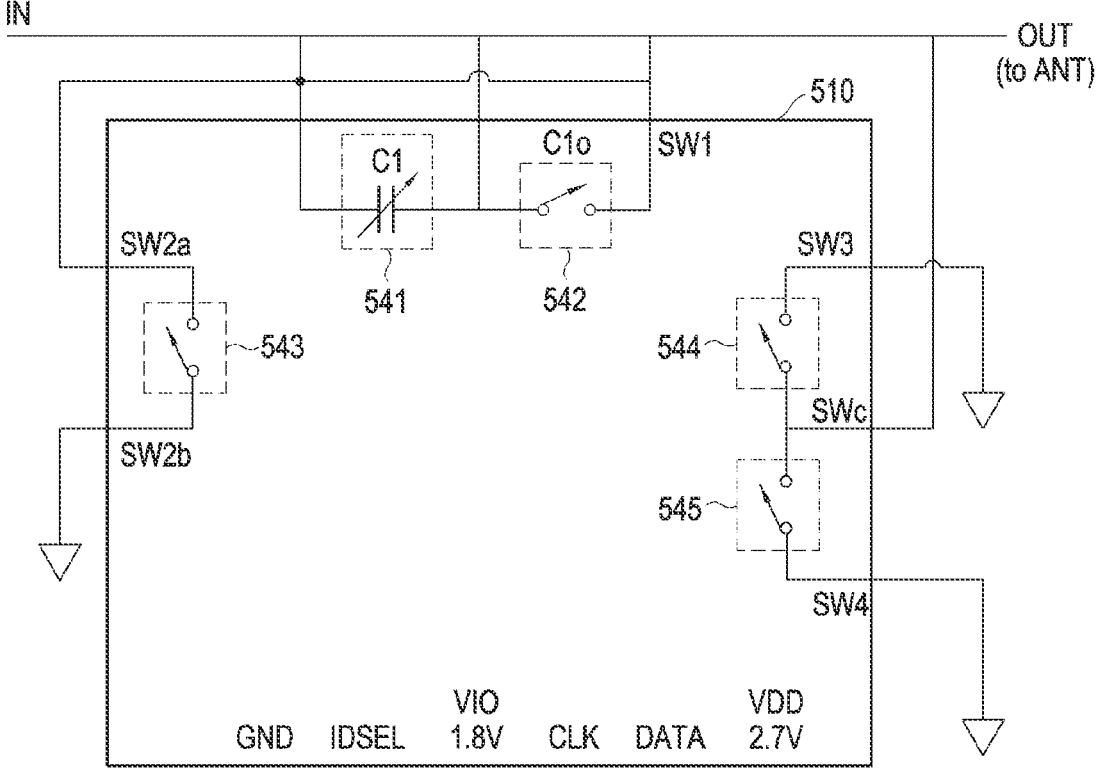
FIG. 5B is a circuit diagram illustrating an antenna tuning circuit according to various embodiments.

Referring to FIG. 5A, an antenna tuning circuit 500 (e.g., first antenna tuning circuit 441a, or second antenna tuning circuit 442a of FIG. 4) according to various embodiments may include at least one impedance tuning circuit 510 and/or at least one aperture tuning circuit 520. The second antenna tuning circuit 442a may be implemented in the same or similar way as the first antenna tuning circuit 441a, but may be implemented differently. The impedance tuning circuit 510 according to various embodiments may be configured to perform impedance matching with a network under a control of at least one processor (e.g., processor 120, communication processor 212 or 214, and/or integrated communication processor 260). The aperture tuning circuit 520 according to various embodiments may change a structure of an antenna by turning on/off a switch under a control of at least one processor. In FIG. 5B, an exemplary circuit diagram for describing the impedance tuning circuit 510 is illustrated. In FIG. 5D, an exemplary circuit diagram for describing the aperture tuning circuit 520 is illustrated. According to various embodiments, the impedance tuning circuit 510 of FIG. 5B may be used as an aperture tuning circuit, and the aperture tuning circuit 520 of FIG. 5C may be used as an impedance tuning circuit.

Referring to FIG. 5B, the impedance tuning circuit 510 according to various embodiments may include at least one variable capacitor 541, a first switch 542, a second switch 543, a third switch 544, and/or a fourth switch 545. According to various embodiments, the numbers of the variable capacitors 541, the first switches 542, the second switches 543, the third switches 544, and the fourth switches 545 may be changed. At least one variable capacitor 541, the first switch 542, the second switch 543, the third switch 544, and the fourth switch 545 according to various embodiments may be implemented on a single chip. The variable capacitor 541 according to various embodiments may have, for example, 16 values (e.g., capacitance values). According to various embodiments, the number of capacitance values of the variable capacitor 541 may be changed. In this case, the impedance tuning circuit 510 according to various embodiments may have a total of 256 (16 (possible values that the variable capacitor may have)×16 (number of possible cases based on combinations of 4 switches)) settable values (e.g., impedance values). The variable capacitor 541 according to various embodiments may be electrically connected to the first switch 542. One ends of the second switch 543, third switch 544, and/or fourth switch 545 according to various embodiments may be grounded.

Figure 5C:
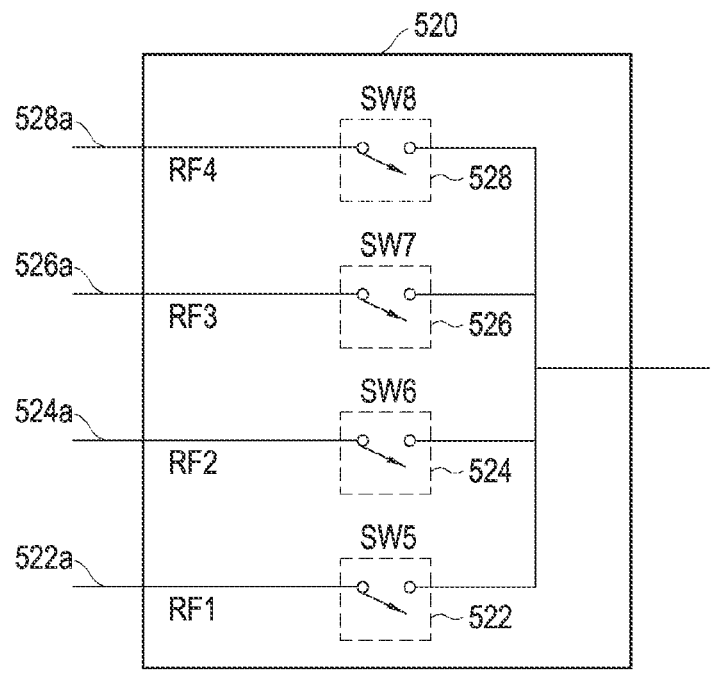
FIG. 5C is a circuit diagram illustrating an antenna tuning circuit according to various embodiments.
Figure 5D:
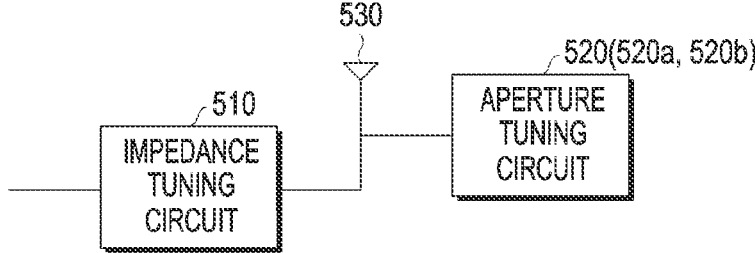
FIG. 5D is a diagram illustrating an antenna tuning circuit according to various embodiments.

Referring to FIG. 5C, the aperture tuning circuit 520 according to various embodiments may include a fifth switch 522, a sixth switch 524, a seventh switch 526, and/or an eighth switch 528. According to various embodiments, the fifth switch 522 may be connected to a first terminal (RF1) 522a. According to various embodiments, the sixth switch 524 may be connected to a second terminal (RF2) 524a. According to various embodiments, the seventh switch 526 may be connected to a third terminal (RF3) 526a. According to various embodiments, the eighth switch 528 may be connected to a fourth terminal (RF4) 528a. According to various embodiments, the number of switches included in the aperture tuning circuit 520 may be changed. According to various embodiments, the fifth switch 522, the sixth switch 524, the seventh switch 526, and/or the eighth switch 528 may be implemented on a single chip. According to various embodiments, the aperture tuning circuit 520 may have a total number of 16 cases based on an on/off combination of switches (e.g., fifth switch 522, sixth switch 524, seventh switch 526, and eighth switch 528). Accordingly, a tuning circuit 250 according to various embodiments may have a total of 4096 antenna configurations (e.g., 256×16).

As illustrated in FIG. 5B and FIG. 5C, according to a change of an on/off state of a switch included in the antenna tuning circuit 500 (e.g., impedance tuning circuit 510 and/or aperture tuning circuit 520), a resonance characteristic (e.g., resonant frequency of the antenna) of a connected antenna may be changed. A combination of on/off states of switches may be referred to as an antenna configuration or an antenna tuning circuit configuration, and an antenna resonance characteristic may be changed or an antenna efficiency of an antenna may be changed according to an antenna configuration.

According to various embodiments, as illustrated in FIG. 5D, the impedance tuning circuit 510 may be connected to an RFFE (e.g., first RFFE 431 or second RFFE 432 of FIG. 4a and FIG. 4b), and may be connected to a duplexer of the RFFE. The impedance tuning circuit 510 may be connected to an antenna 530, and a first aperture tuning circuit 520a and a second aperture tuning circuit 520b may be connected to a power rail that connects the impedance tuning circuit 510 and the antenna 530.

According to various embodiments, the electronic device 101 (e.g., communication processor 260) may change a setting value of the antenna tuning circuit 440a according to a reception signal strength (e.g., reference signal received power (RSRP) or signal to noise ratio (SNR)) or whether imbalance has occurred. In an embodiment, the electronic device 101 may control to change an on/off state of a switch included in the antenna tuning circuit 500 (e.g., impedance tuning circuit 510 and/or aperture tuning circuit 520) as described above, according to a change of a setting value of the antenna tuning circuit 500.

According to various embodiments, FIG. 5D illustrates that one impedance tuning circuit 510 and one aperture tuning circuit 520 are connected to one antenna, but, with respect to one terminal, either the impedance tuning circuit 510 or the aperture tuning circuit 520 may be omitted, or multiple impedance tuning circuits 510 or multiple aperture tuning circuits 520 may be included.

Figure 6:
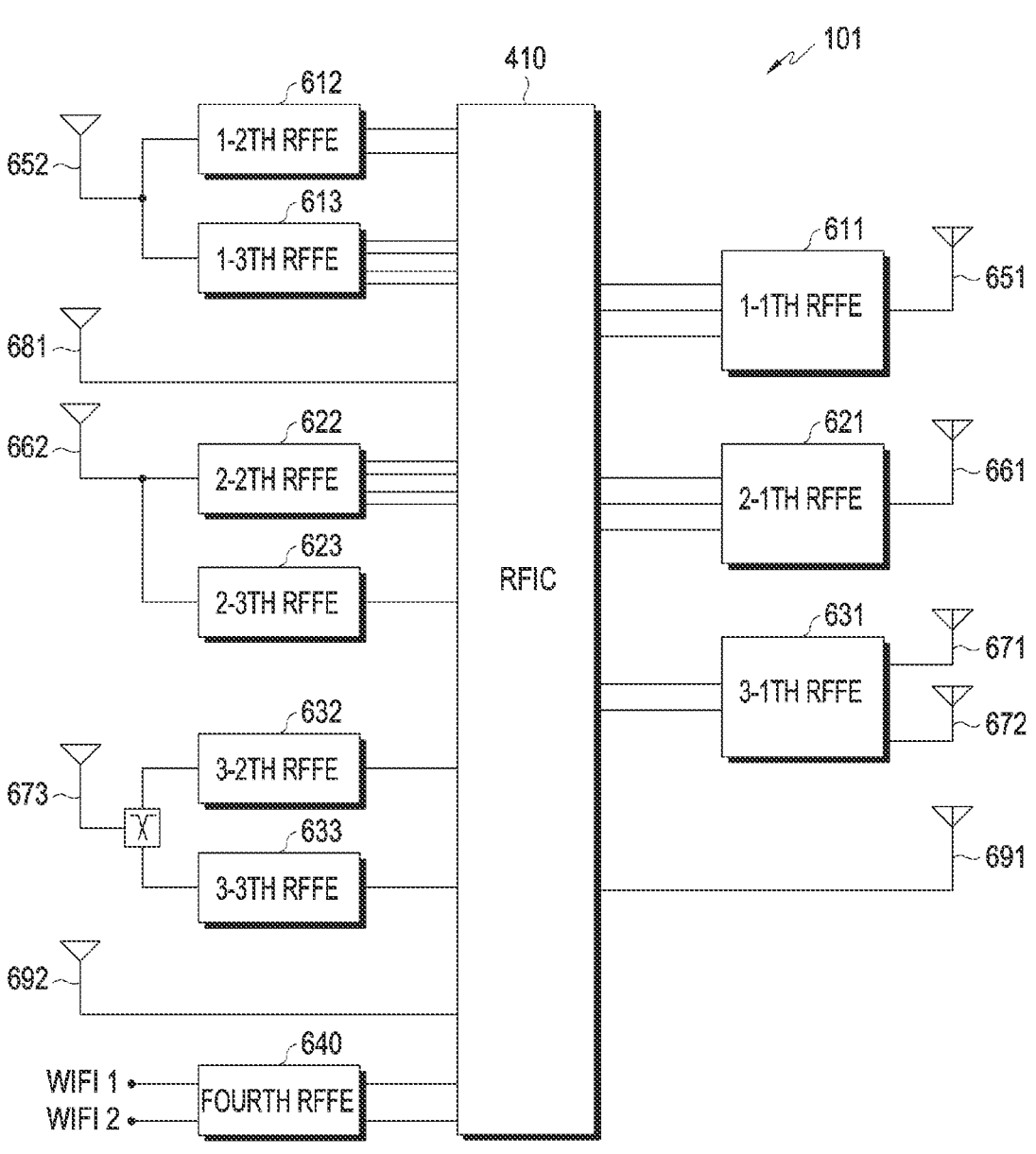
FIG. 6 is a block diagram illustrating the electronic device according to various embodiments.

FIG. 6 is a block diagram illustrating the electronic device according to various embodiments. Referring to FIG. 6, multiple RFFEs 611, 612, 613, 621, 622, 623, 631, 632, 633, and 640 may be connected to at least one RFIC 410. The multiple RFFEs 611, 612, 613, 621, 622, 623, 631, 632, 633, and 640 may be connected to multiple antennas 651, 652, 661, 662, 671, 672, 673, 681, 691, and 692.

According to various embodiments, a 1-1th RFFE 611 may be electrically connected to a first main antenna 651. A 2-1th RFFE 621 may be electrically connected to a second main antenna 661. The 1-2th RFFE, 612 and a 1-3th RFFE 613 may be electrically connected to a first sub antenna 652 so that diversity with the first main antenna 651 may be provided. A 2-2th RFFE, 622 and a 2-3th RFFE 623 may be electrically connected to a second sub antenna 662 so that diversity with the second main antenna 661 may be provided. A 3-1th RFFE 631 may be connected to two third main antennas 671 and 672 so as to provide MIMO. As another example, a 3-2th RFFE 632 and a 3-3th RFFE 633 may be connected to a third sub antenna 673 via a duplexer so that MIMO or diversity with the third main antennas 671 and 672 may be provided. As another example, a fifth antenna 681 may be directly connected from the RFIC 410 without going through an RFFE. As another example, a 6-1th antenna 691 and a 6-2th antenna 692 may also be directly connected from the RFIC 410 without going through an RFFE, and MIMO or diversity may be provided through two antennas. As another example, a fourth RFFE 640 may be connected to two Wi-Fi antennas.

According to various embodiments, at least one of the RFFEs in FIG. 6 may correspond to one of the first RFFE 431 or second RFFE 432 described above in FIG. 4. At least one of the antennas in FIG. 6 may correspond to one of the first antenna 441 or second antenna 442 described above in FIG. 4.

Figure 7:
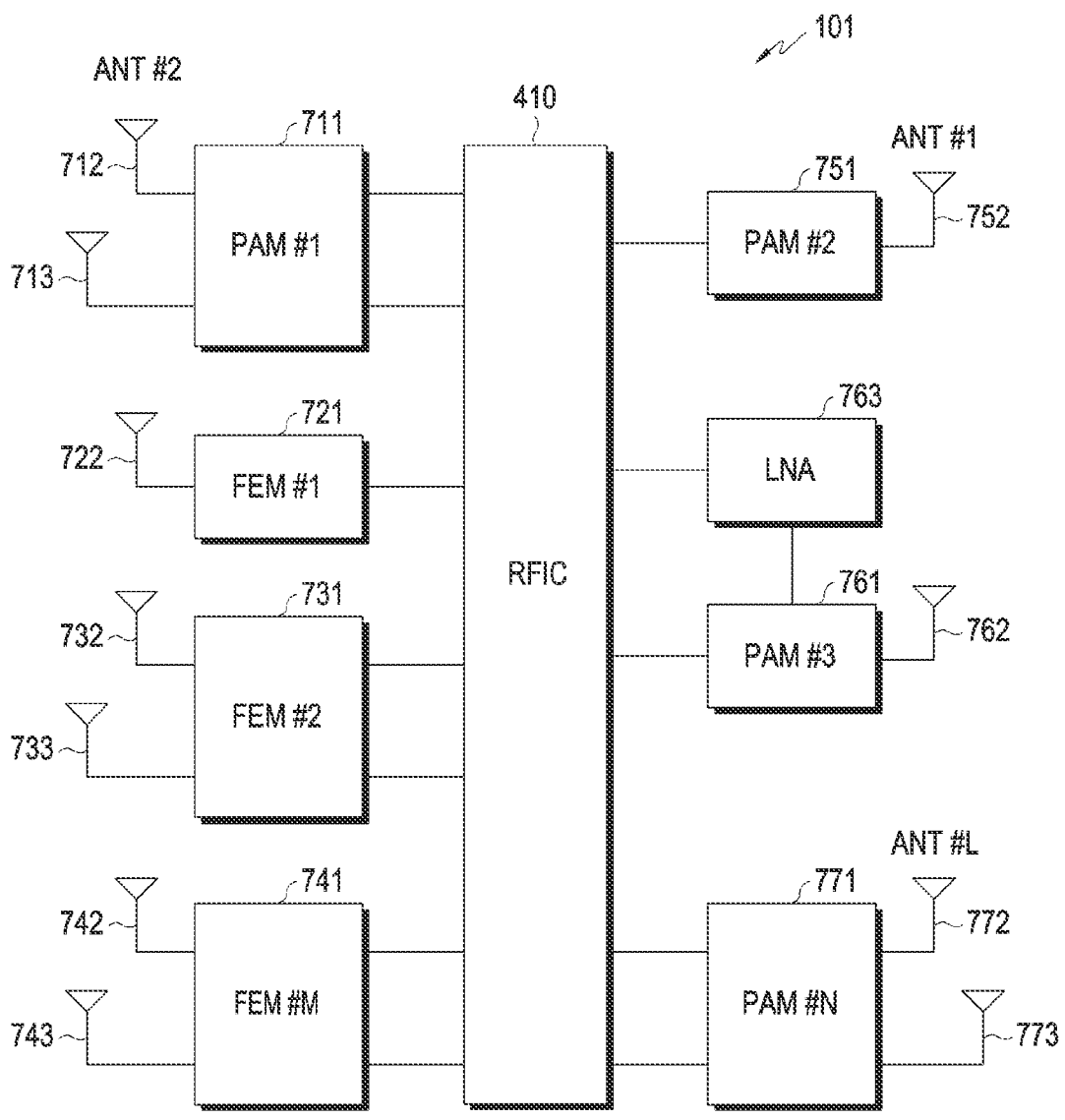
FIG. 7 is a block diagram illustrating the electronic device according to various embodiments.

FIG. 7 is a block diagram illustrating the electronic device according to various embodiments. Referring to FIG. 7, multiple power amplitude modules (PAMs) 711, 751, 761, and 771, and/or multiple front end modules (FEMs) 721, 731, and 741 may be connected to at least one RFIC 410. The multiple PAMs 711, 751, 761, and 771 and/or multiple FEMs 721, 731, and 741 may be respectively connected to at least one antenna 712, 713, 722, 732, 733, 742, 743, 752, 762, 772, and 773.

Each of the multiple PAMs 711, 751, 761, and 771 may include a power amplifier (PA), and may amplify a transmission signal by the power amplifier so as to transmit the same through the antennas 712, 713, 752, 761, 772, and 773. The PAM #3 761 may be formed in a form of a power amplitude module including duplexer (PAMiD) including at least one diplexer or at least one duplexer. The PAM #3 761 may transmit data received through the antenna 762 to an LNA 763 via a diplexer or duplexer. The data received in the LNA 763 may be low noise amplified and then transmitted to the RFIC 410. Each of the multiple FEMs 721, 731, and 741 may include a low noise amplifier (LNA), and may amplify a reception signal by the power amplifier and transmit the same to the RFIC 410.

According to various embodiments, the PAM #1 711 may transmit or receive a mid band or high band 5G frequency (e.g., N1 band, or N3 band) signal. The PAM #2 751 may transmit or receive an ultra high band 5G frequency (e.g., N78 band) signal. For example, when the electronic device 101 operates in SA, a 5G frequency signal may be transmitted or received through the PAM #1 711 or the PAM #N 771. When the electronic device 101 operates in EN-DC, a 5G frequency signal and an LTE frequency signal may be transmitted or received through the PAM #1 711 and the PAM #N 771, respectively.

According to various embodiments, when the electronic device 101 operates in CA or EN-DC, a frequency band to be supported may increase. Due to size restriction of the electronic device 101, the use of FEM parts and antenna paths may be limited, and a single part and antenna may be configured to process multiple frequency components in order to process components of various and complex frequency bands.

According to various embodiments, a refarming band which uses a part of an LTE frequency band as a 5G frequency band may be used. In a frequency band where only LTE or NR exists, when the electronic device 101 processes a signal in an RFIC (e.g., RFIC 410), a mixer in the RFIC may separate and process the signal by using a modulation/demodulation technique suitable for a corresponding RAT.

Figure 8:
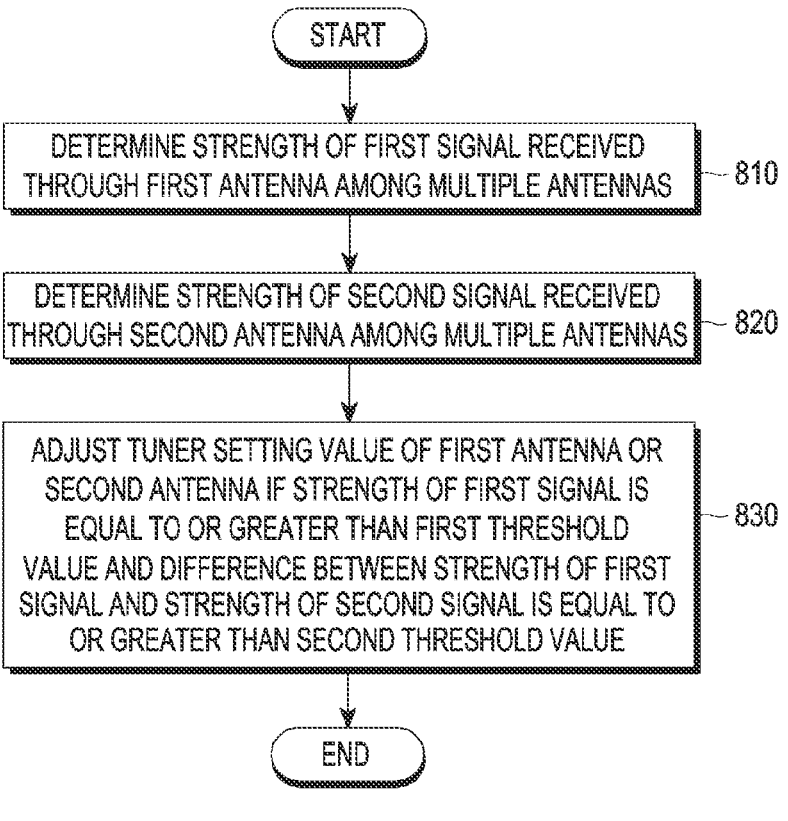
FIG. 8 is a flowchart illustrating a method of operating the electronic device according to various embodiments.

FIG. 8 is a flowchart illustrating a method of operating the electronic device according to various embodiments. Referring to FIG. 8, an electronic device (e.g., electronic device 101) may include multiple antennas (e.g., antenna module 197, first antenna module 242, second antenna module 244, third antenna module 246, first antenna 441, and second antenna 442), at least one antenna tuning circuit (e.g., first antenna tuning circuit 441a and second antenna tuning circuit 442a) connected to at least one antenna among the multiple antennas, and at least one communication processor (e.g., wireless communication module 192, first communication processor 212, second communication processor 214, and integrated communication processor 260). According to various embodiments, the electronic device 101 may receive signals transmitted from a base station based on multiple-input and multiple-output (MIMO) through the multiple antennas (e.g., antenna module 197, first antenna module 242, second antenna module 244, third antenna module 246, first antenna 441, and second antenna 442).

According to various embodiments, an electronic device (e.g., communication processor) may determine a strength of a first signal received through a first antenna among the multiple antennas, in operation 810. The electronic device may determine, operation 820, a strength of a second signal received through a second antenna among the multiple antennas.

According to various embodiments, in operation 830, when the strength of the first signal is equal to or greater than a first threshold value, and a difference between the strength of the first signal and the strength of the second signal is equal to or greater than a second threshold value, the electronic device may adjust a tuner setting value of the first antenna or second antenna. When the strength of the first signal received through the first antenna is equal to or greater than the first threshold, a reception state of the signal may be determined to be good. According to various embodiments, even if the reception state of the signal is good, when the difference between the strength of the first signal received from the first antenna and the strength of the second signal received from the second antenna is equal to or greater than a set value (e.g., second threshold or third threshold), a setting value of an antenna tuning circuit connected to the first antenna or the second antenna may be adjusted so that the difference in strengths between the reception signals is reduced. As the difference between the strengths of the reception signals is reduced, the overall throughput (T-PUT) of the electronic device may be improved. In the following description, when the electronic device 101 operates in MIMO and receives signals from a base station through multiple antennas based on the MIMO, a case in which the difference in strengths of reception signals received through the multiple antennas is equal to or greater than a set value is referred to as an imbalance state.

According to various embodiments, the strengths of the reception signals (e.g., strength of the first signal or strength of the second signal) may include any one selected from a reference signal received power (RSRP), a received strength signal indicator (RSSI), a reference signal received quality (RSRQ), a received signal code power (RSCP), a signal to noise ratio (SNR), or a signal to interference plus noise ratio (SINR). For example, when a difference between an RSRP of the first signal received from the first antenna and an RSRP of the second signal received from the second antenna is equal to or greater than a set value (e.g., second threshold value (e.g., 6 dB to 10 dB)), the electronic device may adjust a setting value of an antenna tuning circuit connected to the first antenna or the second antenna to from a currently configured first setting value to a second setting value. When a difference between an SNR of the first signal received from the first antenna and an SNR of the second signal received from the second antenna is equal to or greater than a set value (e.g., third threshold value (e.g., 6 dB to 10 dB)), the setting value of the antenna tuning circuit connected to the first antenna or the second antenna may be adjusted from a currently set first setting value to a second setting value. The electronic device may increase reception performance of the relatively low-performance antenna by adjusting the setting value of the antenna tuning circuit from the first setting value to the second setting value. As the reception performance of the relatively low-performance antenna improves, imbalance between the first signal received through the first antenna and the second signal received through the second antenna may be improved. According to the improvement of the imbalance, the overall performance (e.g., throughput (T-PUT)) of the electronic device 101 may become better than before. Although the embodiment of FIG. 8 describes to determine whether imbalance occurs from two reception signals received through two respective antennas, the electronic device may, according to various embodiments, determine whether imbalance occurs from three or more reception signals and determine whether imbalance occurs from multiple reception signals received through a single antenna.

The following <Table 1> to <Table 4> illustrate that, as a setting of an antenna tuning circuit is changed, a difference in strengths (for convenience of description, referred to as an "imbalance value") between reception signals varies, and reception performance is changed accordingly.

TABLE 1

| RSRP and MCS assignment according to Antenna Tuner settings | B66 | | | | |
| --- | --- | --- | --- | --- | --- |
| | RX0 | RX1 | Imbalance | MCS | MAX SPEED |
| Tuner setting A | −85.5 | −77 | 8.5 | 14 | 13.78 MHz |
| Tuner setting B (Imbalance improvement) | −77.6 | −76.5 | 1.1 | 20 | 22.38 MHz |

TABLE 2

| RSRP and MCS assignment according to Antenna Tuner settings | B71 | | | | |
| --- | --- | --- | --- | --- | --- |
| | RX0 | RX1 | Imbalance | MCS | MAX SPEED |
| Tuner setting A | −80.3 | −68.7 | 11.6 | 15 | 14.91 MHz |
| Tuner setting B (Imbalance improvement) | −74.7 | −70.3 | 4.4 | 23 | 27.67 MHz |

TABLE 3

| RSRP and MCS assignment according to Antenna Tuner settings | B5 | | | | |
| --- | --- | --- | --- | --- | --- |
| | RX0 | RX1 | Imbalance | MCS | MAX SPEED |
| Tuner setting A | −79.7 | −67.6 | 12.1 | 16 | 16.03 MHz |
| Tuner setting B (Imbalance improvement) | −74.7 | −68.9 | 5.8 | 23 | 27.67 MHz |

TABLE 4

| RSRP and MCS assignment according to Antenna Tuner settings | B12 | | | | |
| --- | --- | --- | --- | --- | --- |
| | RX0 | RX1 | Imbalance | MCS | MAX SPEED |
| Tuner setting A | −78.1 | −68.7 | 9.4 | 17 | 17.91 MHz |
| Tuner setting B (Imbalance improvement) | −73.8 | −68.3 | 5.5 | 22 | 26.73 MHz |

Referring to <Table 1> to <Table 4>, when an RSRP difference between the first reception signal (RX0) and the second reception signal (RX1) is equal to or greater than a threshold value (e.g., 6 dB) in a state where the antenna tuner setting corresponds to setting value "A", it may be seen that an imbalance value is reduced and an imbalance state is thus improved by adjusting the antenna tuner setting to setting value "B". For example, referring to <Table 1>, with respect to a B66 frequency band, as the RSRP difference (imbalance value) between the first reception signal (RX0) and the second reception signal (RX1) is 8.5 and is determined to be equal to or greater than the threshold value (e.g., 6 dB) in a state where the antenna tuner setting corresponds to setting value "A", it may be seen that the imbalance value is improved to 1.1 by adjusting the antenna tuner setting to setting value "B". According to the imbalance improvement, the base station may assign a modulation and coding scheme (MCS), which is assigned to the electronic device, by increasing the MCS from 14 to 20, and it may be seen that a throughput increases from 13.78 MHz to 22.38 MHz according to assignment of the higher MCS. Referring to <Table 2>, with respect to a B71 frequency band, as the RSRP difference (imbalance value) between the first reception signal (RX0) and the second reception signal (RX1) is 11.6 and is determined to be equal to or greater than the threshold value (e.g., 6 dB) in a state where the antenna tuner setting corresponds to setting value "A", it may be seen that the imbalance value is improved to 4.4 by adjusting the antenna tuner setting to setting value "B". According to the imbalance improvement, the base station may assign a modulation and coding scheme (MCS), which is assigned to the electronic device, by increasing the MCS from 15 to 23, and it may be seen that a throughput increases from 14.91 MHz to 27.67 MHz according to assignment of the higher MCS. Referring to <Table 3>, with respect to a B5 frequency band, as the RSRP difference (imbalance value) between the first reception signal (RX0) and the second reception signal (RX1) is 12.1 and is determined to be equal to or greater than the threshold value (e.g., 6 dB) in a state where the antenna tuner setting corresponds to setting value "A", it may be seen that the imbalance value is improved to 5.8 by adjusting the antenna tuner setting to setting value "B". According to the imbalance improvement, the base station may assign the modulation and coding scheme (MCS), which is assigned to the electronic device, by increasing the MCS from 16 to 23, and it may be seen that the throughput increases from 16.03 MHz to 27.67 MHz according to assignment of the higher MCS. Referring to <Table 4>, with respect to a B12 frequency band, as the RSRP difference (imbalance value) between the first reception signal (RX0) and the second reception signal (RX1) is 9.4 and is determined to be equal to or greater than the threshold value (e.g., 6 dB) in a state where the antenna tuner setting corresponds to setting value "A", it may be seen that the imbalance value is improved to 5.5 by adjusting the antenna tuner setting to setting value "B". According to the imbalance improvement, the base station may assign the modulation and coding scheme (MCS), which is assigned to the electronic device, by increasing the MCS from 17 to 22, and it may be seen that the throughput increases from 17.91 MHz to 26.73 MHz according to assignment of the higher MCS.

According to various embodiments, the aforementioned embodiments describe determination of whether imbalance occurs, based on a difference in strengths between reception signals, but various embodiments are not limited thereto, and conditions for determining whether imbalance occurs may be set in various ways.

According to various embodiments, when the electronic device is operating in MIMO (e.g., 2×2 MIMO or 4×4 MIMO), whether imbalance occurs may be determined based on rank information reported to the base station by the electronic device. For example, when a rank index reported to the base station by the electronic device is applied downward compared to a rank configured by the base station and reported, it may be determined that imbalance has occurred (e.g., it is determined that an imbalance condition is satisfied). The rank may be configured by the base station, based on information included in a UE capability message reported to the base station by the electronic device. The base station may transmit information relating to a rank configured to be equal to or less than a settable maximum rank to the electronic device via an RRC reconfiguration message. The electronic device may operate MIMO, based on the rank configured via the RRC reconfiguration message.

According to various embodiments, when the rank received from the base station is configured to 2, the electronic device may operate in one of single Tx/Rx, Tx/Rx diversity, and 2×2 MIMO. According to various embodiments, the electronic device operating in 2×2 MIMO may report the currently operating rank information (e.g., rank index) to the base station via channel state information (CSI) reporting. For example, when the electronic device reports rank information (e.g., rank index) of 1 to the base station, the electronic device may determine that imbalance has occurred, by reporting a value smaller than the rank configured by the base station. According to another embodiment, when the rank received from the base station is configured to 4, the electronic device may operate in one of single Tx/Rx, Tx/Rx diversity, 2×2 MIMO, and 4×4 MIMO. According to various embodiments, when the electronic device operating in 4×4 MIMO reports rank information (e.g., rank index) of 1 to 3 to the base station, the electronic device may determine that imbalance has occurred, by reporting a value smaller than the rank configured by the base station. In the aforementioned examples, the maximum rank is exemplified to be 2 or 4, but the disclosure is not limited thereto, and other values, such as 8 or 16, may be configured.

According to various embodiments, when the electronic device supports a sounding reference signal (SRS), whether there is imbalance may be determined based on a layer set for the electronic device by the base station. For example, when a change is made to a value smaller than the layer assigned from the base station, the electronic device supporting the SRS may determine that imbalance has occurred. For example, when the electronic device operating in 2×2 MIMO is assigned with only layer 1, or the electronic device operating in 4×4 MIMO is assigned with only layer 3, it may be determined that imbalance has occurred (e.g., determining that an imbalance condition is satisfied).

Hereinafter, specific embodiments for determining occurrence of imbalance will be described. When the electronic device operates in MIMO, the electronic device may receive signals transmitted from the base station based on MIMO through the first antenna and the second antenna, respectively. For example, the electronic device may receive a first signal through the first antenna and may receive a second signal through the second antenna. When an SNR of the first signal received through the first antenna is 13 dB, an SNR of the second signal received through the second antenna is 20 dB, and a third threshold value for imbalance determination is set to 7 dB, a difference in SNRs between the first signal and the second signal is 7 dB which is equal to or greater than the third threshold value, and it may be thus determined that an imbalance condition is satisfied. As another example, when an RSRP of the first signal received through the first antenna is −75 dBm, an RSRP of the second signal received through the second antenna is −82 dBm, and a second threshold value for imbalance determination is set to 7 dB, a difference in RSRPs between the first signal and the second signal 7 dB which is equal to or greater than the second threshold value, it may be thus determined that the imbalance condition is satisfied.

According to various embodiments, as the electronic device operates in the MIMO, signals transmitted from the base station based on the MIMO may be received through multiple antennas. For example, a first signal may be received through a first antenna, a second signal may be received through a second antenna, a third signal may be received through a third antenna, and a fourth signal may be received through a fourth antenna. When an SNR of the first signal received through the first antenna is 14 dB, an SNR of the second signal received through the second antenna is 21 dB, an SNR of the third signal received through the third antenna is 15 dB, an SNR of the fourth signal received through the fourth antenna is 16 dB, and a third threshold value for imbalance determination is set to 7 dB, a difference in SNRs between the first signal having a smallest SNR and the second signal having a largest SNR is 7 dB which is equal to or greater than the third threshold value, and it may be thus determined that the imbalance condition is satisfied.

According to various embodiments, the determination of whether an imbalance condition is satisfied, described in FIG. 8, may be configured to be applied when the electronic device operates in MIMO. For example, when an SNR of a signal received from the first antenna of the electronic device is equal to or smaller than a set value (e.g., 0 dB), the electronic device may operate in 4Rx-based diversity rather than operating in MIMO with respect to multiple antennas. When the electronic device operates in 4Rx-based diversity, a configuration may be performed not to determine whether an imbalance condition is satisfied, and when the electronic device operates in MIMO, a configuration may be performed to determine whether the imbalance condition is satisfied.

According to various embodiments, the method of adjusting the setting value of the antenna tuning circuit in operation 830 may include adjusting the setting value of the antenna tuning circuit from the first setting value to the second setting value as described above, and may include, as another example, adjusting a setting mode related to the antenna tuning circuit from a first mode to a second mode. For example, the first mode or the second mode may include any one selected from among a mode (for convenience of description, referred to as "Tx only mode") in which transmission performance of at least one antenna among the multiple antennas is set to be maximum, a mode (for convenience of description, referred to as "Rx only mode") in which reception performance of at least one antenna among the multiple antennas is set to be maximum, and a mode (for convenience of description, referred to as "Tx/Rx Balanced mode") set to a setting value in which reception performance is set to be maximum from among setting values for which transmission performance belongs to a set range. According to various embodiments, when the configuration of the antenna tuning circuit operates by a closed loop control, the method of adjusting the setting mode may be applied, and a detailed description thereof will be provided with reference to FIG. 11 to FIG. 13. In the aforementioned description of FIG. 8, it is described that when the strength of the first signal is greater than or equal to the first threshold, whether the imbalance condition is satisfied is determined. However, according to various embodiments, the electronic device may be configured to determine whether the imbalance condition is satisfied under a condition that a transmission signal has a value equal to or less than a set threshold value. A detailed description thereof will be provided in the description of FIG. 11.

Figure 9:
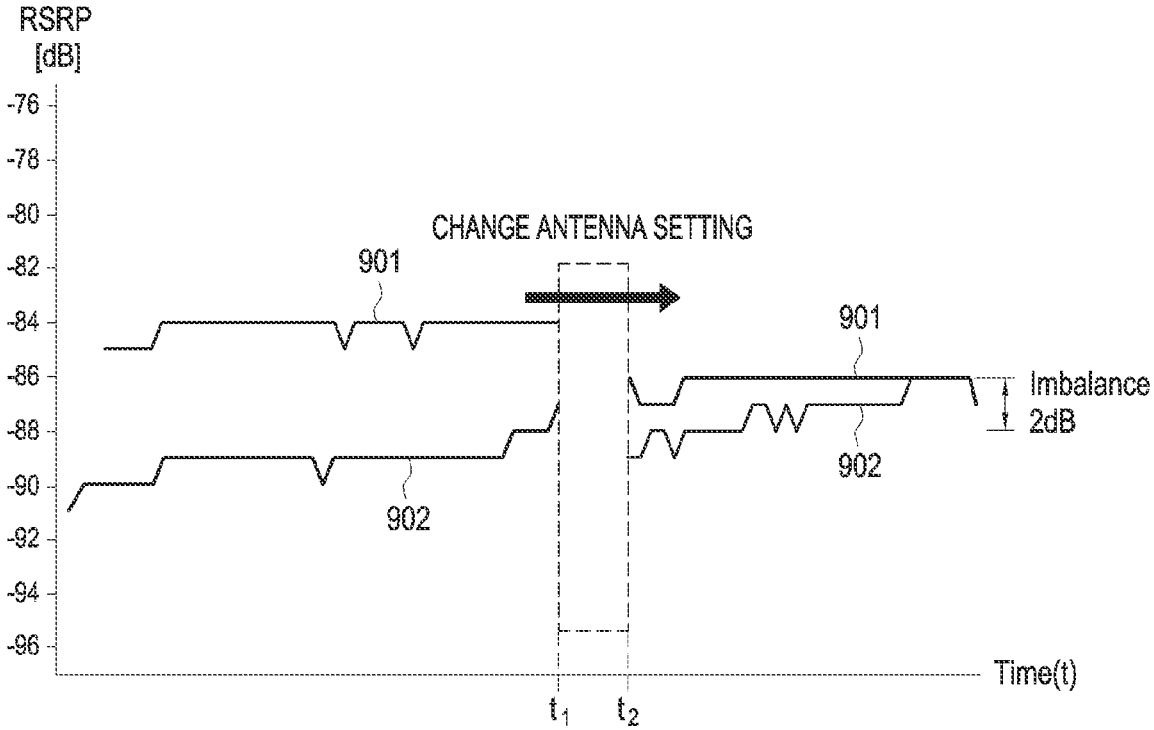
FIG. 9 is a graph illustrating a reception signal strength of each antenna according to various embodiments.

FIG. 9 is a graph illustrating a reception signal strength of each antenna according to various embodiments. Referring to FIG. 9, the electronic device 101 may configure, before time point t1, in a state where a strength of a reception signal is less than a first threshold value (e.g., −90 dBm), an antenna tuning circuit to a first setting value so that, reception performance of a first signal 901 received through a first antenna and reception performance of a second signal 902 received through a second antenna are excellent. The electronic device 101 may monitor a reception signal strength and determine that, even when the strength of the first signal 901 is equal to or greater than the first threshold value and is in an excellent state at time point t1, an imbalance condition between the first signal 901 and the second signal is satisfied, and the electronic device 101 may change an antenna setting (e.g., setting of the antenna tuning circuit) from the first setting value to a second setting value until time point t2. The electronic device 101 may operate according to the antenna tuning circuit set to the second setting value after time point t2. The electronic device 101 may operate according to the second setting value after time point t2 such that the difference between the first signal 901 and the second signal 901 is small, thereby reducing an imbalance value. For example, referring to FIG. 9, it may be seen that, as the electronic device 101 changes the setting of the antenna tuning circuit from the first setting value to the second setting value, the difference in reception signal strengths between the first signal 901 and the second signal 902 is reduced to about 2 dB or less. According to various embodiments, the strength of the first signal 901 has become less at time point t2 than at time point t1, but the overall performance (e.g., throughput (T-PUT)) of the electronic device 101 may be improved as the imbalance between the first signal 902 and the second signal 902 is resolved.

Figure 10:
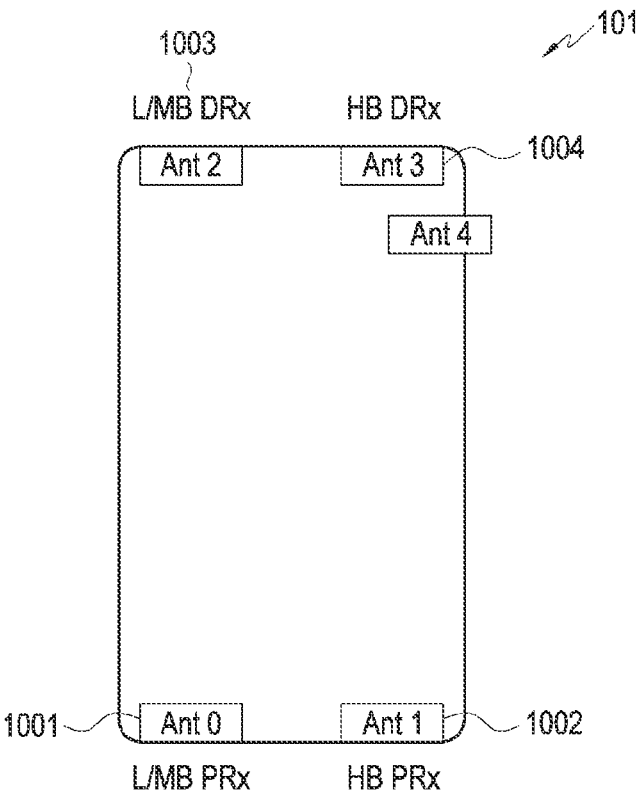
FIG. 10 is a diagram illustrating an antenna arrangement of the electronic device according to various embodiments.

FIG. 10 is diagram illustrating an antenna arrangement of the electronic device according to various embodiments. Referring to FIG. 10, according to various embodiments, a determination of whether imbalance occurs may be made with respect to a reception signal using the same antenna as a base station (e.g., cell) using an antenna requiring imbalance improvement. For example, when the electronic device transmits or receives signals in B5+N7 frequency bands, and an antenna, for which imbalance improvement for a reception signal of B5 is required, is Ant0 1001, and N7 uses ANT1 1002 and ANT3 1004, Tx/Rx of N7 may not be considered. As another example, when the electronic device transmits or receives signals in B5+B66+N66 frequency bands, an antenna for which imbalance improvement of B5 is required is Ant0 1001, B66 uses Ant0 1001 and Ant2 1003, and N66 also uses Ant0 (Tx+Rx) 1001 and Ant2 1003, whether to perform operation to improve imbalance may be determined by checking that an Rx SNR of B66 Ant0 1001 and a transmission signal of N66 Ant0 1001 have values equal to or smaller than a set threshold value, and checking whether an SNR of a reception signal is equal to or greater than a set threshold value.

Figure 11:
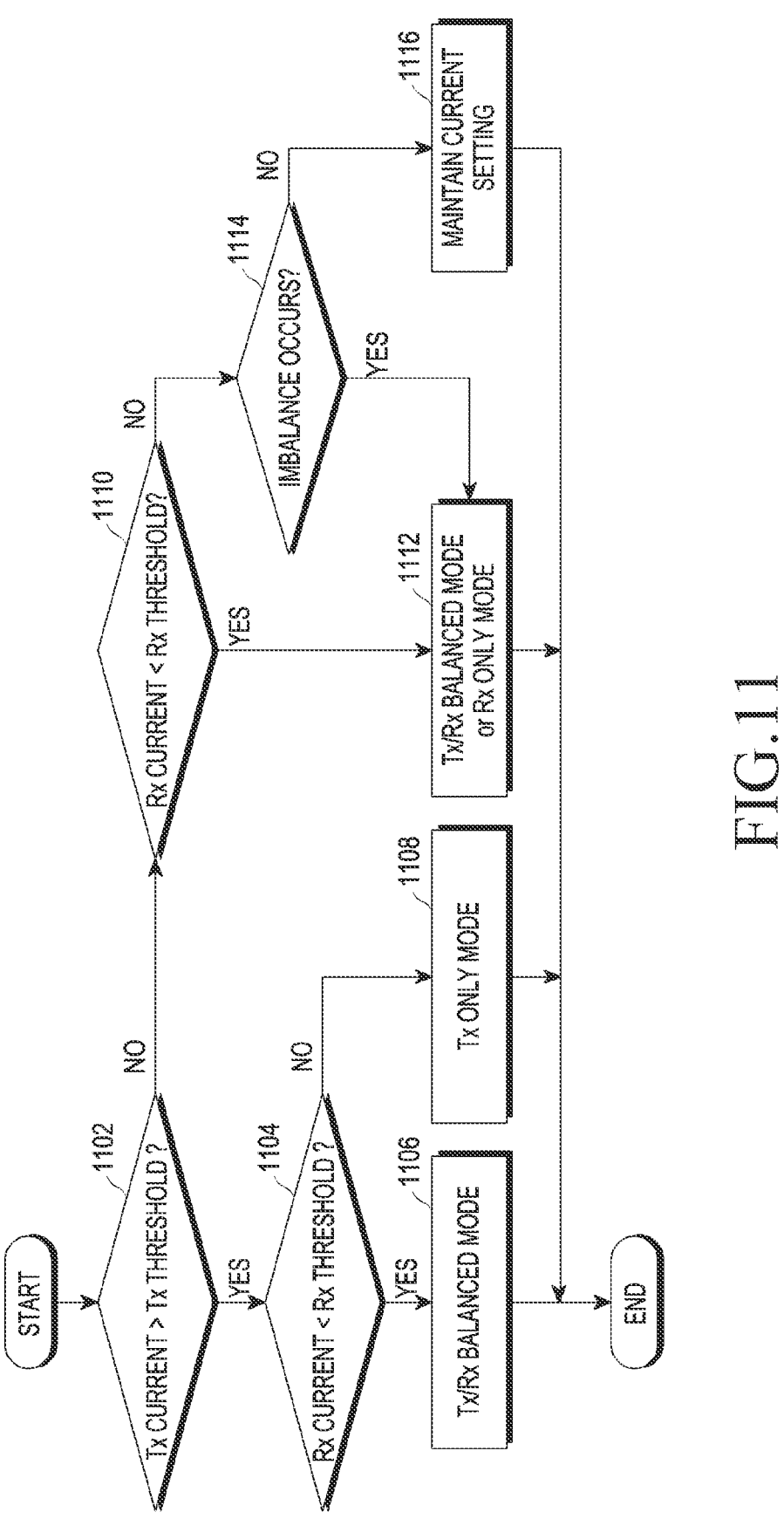
FIG. 11 is a diagram illustrating flowchart illustrating a method operating of the electronic device according to various embodiments.

FIG. 11 is a flowchart illustrating a method of operating the electronic device according to various embodiments. Referring to FIG. 11, an electronic device (e.g., electronic device 101) may include multiple antennas (e.g., antenna module 197, first antenna module 242, second antenna module 244, third antenna module 246, first antenna 441, second antenna 442, third antenna 443, fourth antenna 444, and fifth antenna 445), at least one antenna tuning circuit (e.g., first antenna tuning circuit 441a, second antenna tuning circuit 442a, and third antenna tuning circuit 443a) connected to at least one antenna among the multiple antennas, and at least one communication processor (e.g., wireless communication module 192, first communication processor 212, second communication processor 214, and integrated communication processor 260).

According to various embodiments, an electronic device (e.g., communication processor) may determine whether a strength (Tx Current) of a transmission signal exceeds a set threshold value (e.g., first threshold value (Tx Threshold)), in operation 1102. When the strength (Tx Current) of the transmission signal exceeds the set threshold value (Tx Threshold), the electronic device may determine that an electric field state of the transmission signal is not good. As a result of the determination in operation 1102, when the strength (Tx Threshold) of the transmission signal exceeds (Yes in operation 1102) the threshold value, the electronic device may determine whether a strength (Rx Current) of a reception signal is less than a set threshold value (Rx Threshold) (e.g., second threshold), in operation 1104. When the strength (Rx Current) of the reception signal is less than the set threshold value (Rx Threshold), the electronic device may determine that an electric field state of the reception signal is not good. As a result of the determination in operation 1104, when the strength (Rx Current) of the reception signal is less than the set threshold value (Yes in operation 1104), the electronic device may configure the antenna tuning circuit to a "Tx/Rx Balanced mode", in operation 1106. As a result of the determination in operation 1104, when the strength (Rx Current) of the reception signal is equal to or greater than the set threshold value (Rx Threshold) (No in operation 1104), the electronic device may configure the antenna tuning circuit to a "Tx Only mode", in operation 1108.

According to various embodiments, as a result of the determination in operation 1102, when the strength (Tx current) of the transmission signal does not exceed (No in operation 1102) the threshold value (Tx Threshold), the electronic device may determine whether the strength (Rx Current) of the reception signal is less than the set threshold value (Rx Threshold) (e.g., second threshold), in operation 1110. As a result of the determination in operation 1110, when the strength (Rx Current) of the reception signal is less than the set threshold value (Rx Threshold) (Yes in operation 1110), the electronic device may configure the antenna tuning circuit to the "Tx/Rx Balanced mode" or an "Rx Only mode" in operation 1112. As a result of the determination in operation 1110, when the strength (Rx Current) of the reception signal is equal to or greater than the set threshold value (Tx Threshold) (No in operation 1110), the electronic device may determine whether imbalance occurs (e.g., whether an imbalance condition is satisfied), in operation 1114. The embodiments described in FIG. 8 may be applied to determination of whether the imbalance has occurred, and a detailed description thereof may not be repeated here.

According to various embodiments, as a result of the determination in operation 1114, when the set imbalance condition is satisfied and it is thus determined that imbalance has occurred (Yes in operation 1114), the electronic device may configure, in operation 1112, the antenna tuning circuit to the "Tx/Rx Balanced mode" or the "Rx Only mode" to improve the imbalance state even through the strength (Rx current) of the reception signal is in a good state. As a result of the determination in operation 1114, when the set imbalance condition is not satisfied and it is thus determined that no imbalance has occurred (No in operation 1114), the electronic device may maintain the setting of the antenna tuning circuit in a current state, in operation 1116.

As described above, the "Tx only mode" may refer to a mode in which transmission performance of at least one antenna among the multiple antennas is set to be maximum, the "Rx only mode" may refer to a mode in which reception performance of at least one antenna among the multiple antennas is set to be maximum, and the "Tx/Rx Balanced mode" may refer to a mode in which transmission performance is set to be a setting value having best reception performance from among setting values within a set range (e.g., headroom). According to various embodiments, the aforementioned embodiment of FIG. 11 may be applied to an electronic device that performs a closed loop control of an antenna tuning circuit, but is not limited thereto.

Figure 12:
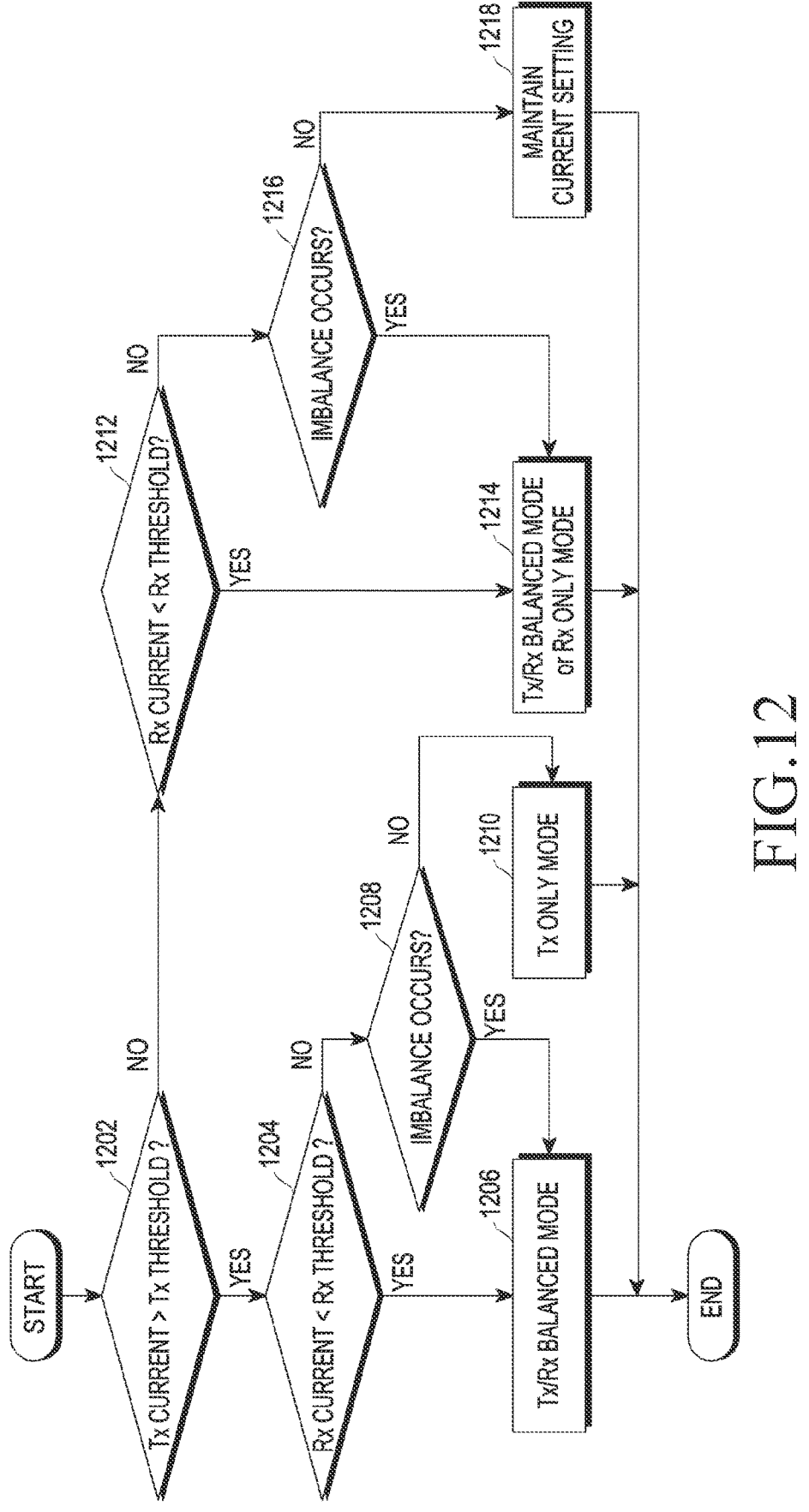
FIG. 12 is a flowchart illustrating a method of operating the electronic device according to various embodiments.

FIG. 12 is a flowchart illustrating a method of operating the electronic device according to various embodiments. Referring to FIG. 12, an electronic device (e.g., electronic device 101) may include multiple antennas (e.g., antenna module 197, first antenna module 242, second antenna module 244, third antenna module 246, first antenna 441, second antenna 442, third antenna 443, fourth antenna 444, and fifth antenna 445), at least one antenna tuning circuit (e.g., first antenna tuning circuit 441a, second antenna tuning circuit 442a, and third antenna tuning circuit 443a) connected to at least one antenna among the multiple antennas, and at least one communication processor (e.g., wireless communication module 192, first communication processor 212, second communication processor 214, and integrated communication processor 260).

According to various embodiments, an electronic device (e.g., communication processor) may determine whether a strength (Tx Current) of a transmission signal exceeds a set threshold value (Tx Threshold) (e.g., first threshold value), in operation 1202. When the strength (Tx Current) of the transmission signal exceeds the set threshold value (Tx Threshold), the electronic device may determine that an electric field state of the transmission signal is not good. As a result of the determination in operation 1202, when the strength (Tx current) of the transmission signal exceeds (Yes in operation 1202) the threshold value (Tx Threshold), the electronic device may determine whether a strength (Rx Current) of a reception signal is less than a set threshold value (Rx Threshold) (e.g., second threshold), in operation 1204. When the strength (Rx Current) of the reception signal is less than the set threshold value (Rx Threshold), the electronic device may determine that an electric field state of the reception signal is not good. As a result of the determination in operation 1204, when the strength (Rx Current) of the reception signal is less than the set threshold value (Rx Threshold) (Yes in operation 1204), the electronic device may configure the antenna tuning circuit to a "Tx/Rx Balanced mode", in operation 1206. As a result of the determination in operation 1204, when the strength (Rx Current) of the reception signal is equal to or greater than the set threshold value (Rx Threshold) (No in operation 1204), the electronic device may determine whether imbalance occurs (e.g., whether an imbalance condition is satisfied), in operation 1208. The embodiments described in FIG. 8 may be applied to determination of whether the imbalance has occurred, and a detailed description thereof may not be repeated here.

According to various embodiments, as a result of the determination in operation 1208, when the set imbalance condition is satisfied and it is thus determined that imbalance has occurred (Yes in operation 1208), the electronic device may configure, in operation 1206, the antenna tuning circuit to the "Tx/Rx Balanced mode" to improve the imbalance state even through the strength (Rx current) of the reception signal is in a good state. As a result of the determination in operation 1208, when the set imbalance condition is not satisfied and it is thus determined that no imbalance has occurred (No in operation 1208), the electronic device may configure the antenna tuning circuit to a "Tx Only mode" in operation 1210.

According to various embodiments, as a result of the determination in operation 1202, when the strength (Tx current) of the transmission signal does not exceed (No in operation 1202) the threshold value (Tx Threshold), the electronic device may determine whether the strength (Rx Current) of the reception signal is less than the set threshold value (Rx Threshold) (e.g., second threshold), in operation 1212. As a result of the determination in operation 1212, when the strength (Rx Current) of the reception signal is less than the set threshold value (Rx Threshold) (Yes in operation 1212), the electronic device may configure the antenna tuning circuit to the "Tx/Rx Balanced mode" or an "Rx Only mode" in operation 1214. As a result of the determination in operation 1212, when the strength (Rx Current) of the reception signal is equal to or greater than the set threshold value (Rx Threshold) (No in operation 1212), the electronic device may determine whether imbalance occurs (e.g., whether the imbalance condition is satisfied), in operation 1216. The embodiments described in FIG. 8 may be applied to determination of whether the imbalance has occurred, and a detailed description thereof may not be repeated here.

According to various embodiments, as a result of the determination in operation 1216, when the set imbalance condition is satisfied and it is thus determined that imbalance has occurred (Yes in operation 1216), the electronic device may configure, in operation 1214, the antenna tuning circuit to the "Tx/Rx Balanced mode" or the "Rx Only mode" to improve the imbalance state even through the strength (Rx current) of the reception signal is in a good state. As a result of the determination in operation 1216, when the set imbalance condition is not satisfied and it is thus determined that no imbalance has occurred (No in operation 1216), the electronic device may maintain the setting of the antenna tuning circuit in a current state, in operation 1218.

As described above, the "Tx only mode" may refer to a mode in which transmission performance of at least one antenna among the multiple antennas is set to be maximum, the "Rx only mode" may refer to a mode in which reception performance of at least one antenna among the multiple antennas is set to be maximum, and the "Tx/Rx Balanced mode" may refer to a mode in which transmission performance is set to be a setting value having best reception performance from among setting values within a set range (e.g., headroom). According to various embodiments, the aforementioned embodiment of FIG. 12 may be applied to an electronic device that performs a closed loop control of an antenna tuning circuit, but is not limited thereto.

Figure 13:
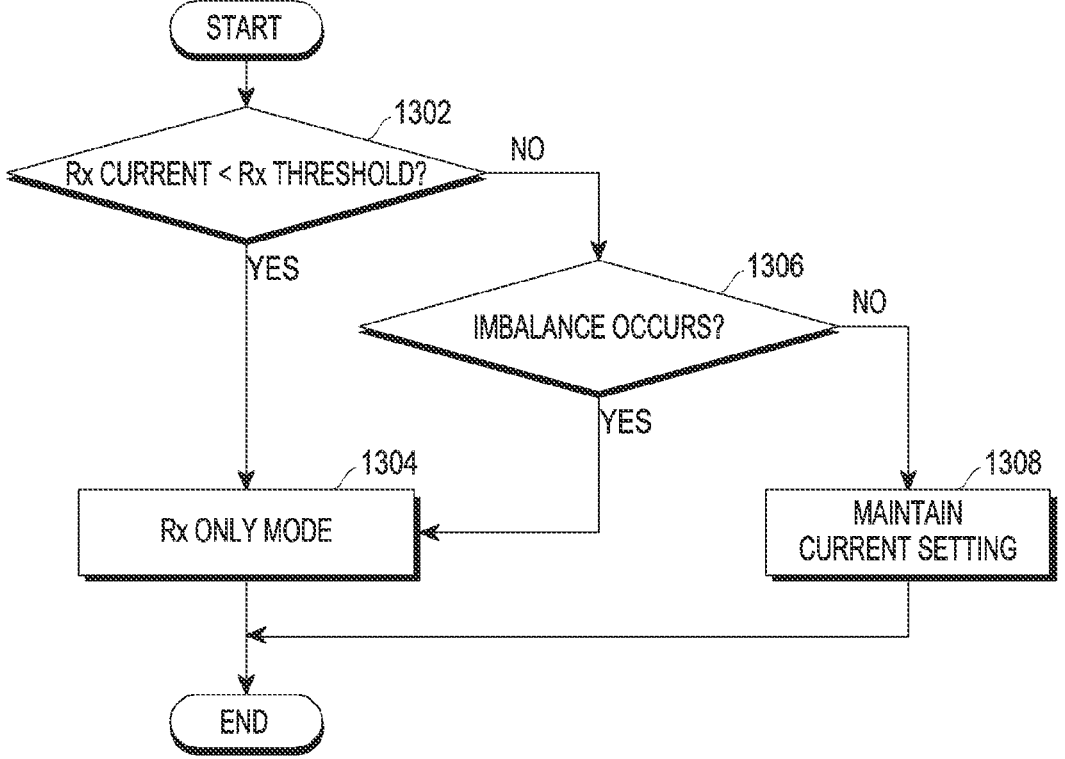
FIG. 13 is a flowchart illustrating a method of operating the electronic device according to various embodiments.

FIG. 13 is a flowchart illustrating a method of operating the electronic device according to various embodiments. Referring to FIG. 13, an electronic device (e.g., electronic device 101) may include multiple antennas (e.g., antenna module 197, first antenna module 242, second antenna module 244, third antenna module 246, first antenna 441, second antenna 442, third antenna 443, fourth antenna 444, and fifth antenna 445), at least one antenna tuning circuit (e.g., first antenna tuning circuit 441a, second antenna tuning circuit 442a, and third antenna tuning circuit 443a) connected to at least one antenna among the multiple antennas, and at least one communication processor (e.g., wireless communication module 192, first communication processor 212, second communication processor 214, and integrated communication processor 260).

According to various embodiments, an electronic device (e.g., communication processor) may determine whether a strength (Rx Current) of a reception signal is less than a set threshold value (Rx Threshold), in operation 1302. As a result of the determination in operation 1302, when the strength (Rx Current) of the reception signal is less than the set threshold value (Rx Threshold) (Yes in operation 1302), the electronic device may configure the antenna tuning circuit to an "Rx Only mode", in operation 1304. As a result of the determination in operation 1302, when the strength (Rx Current) of the reception signal is equal to or greater than the set threshold value (Rx Threshold) (No in operation 1302), the electronic device may determine whether imbalance occurs (e.g., whether an imbalance condition is satisfied), in operation 1306. The embodiments described in FIG. 8 may be applied to determination of whether the imbalance has occurred, and a detailed description thereof may not be repeated here.

According to various embodiments, as a result of the determination in operation 1306, when the set imbalance condition is satisfied and it is thus determined that imbalance has occurred (Yes in operation 1306), the electronic device may configure, in operation 1304, the antenna tuning circuit to the "Rx Only mode" to improve the imbalance state even through the strength of the reception signal is in a good state. As a result of the determination in operation 1306, when the set imbalance condition is not satisfied and it is thus determined that no imbalance has occurred (No in operation 1306), the electronic device may maintain the setting of the antenna tuning circuit in a current state, in operation 1308. As described above, the "Rx only mode" may refer to a mode in which reception performance of at least one antenna among the multiple antennas is set to be maximum. According to various embodiments, the aforementioned embodiment of FIG. 13 may be applied to an electronic device that performs a closed loop control of an antenna tuning circuit, but is not limited thereto.

Figure 14:
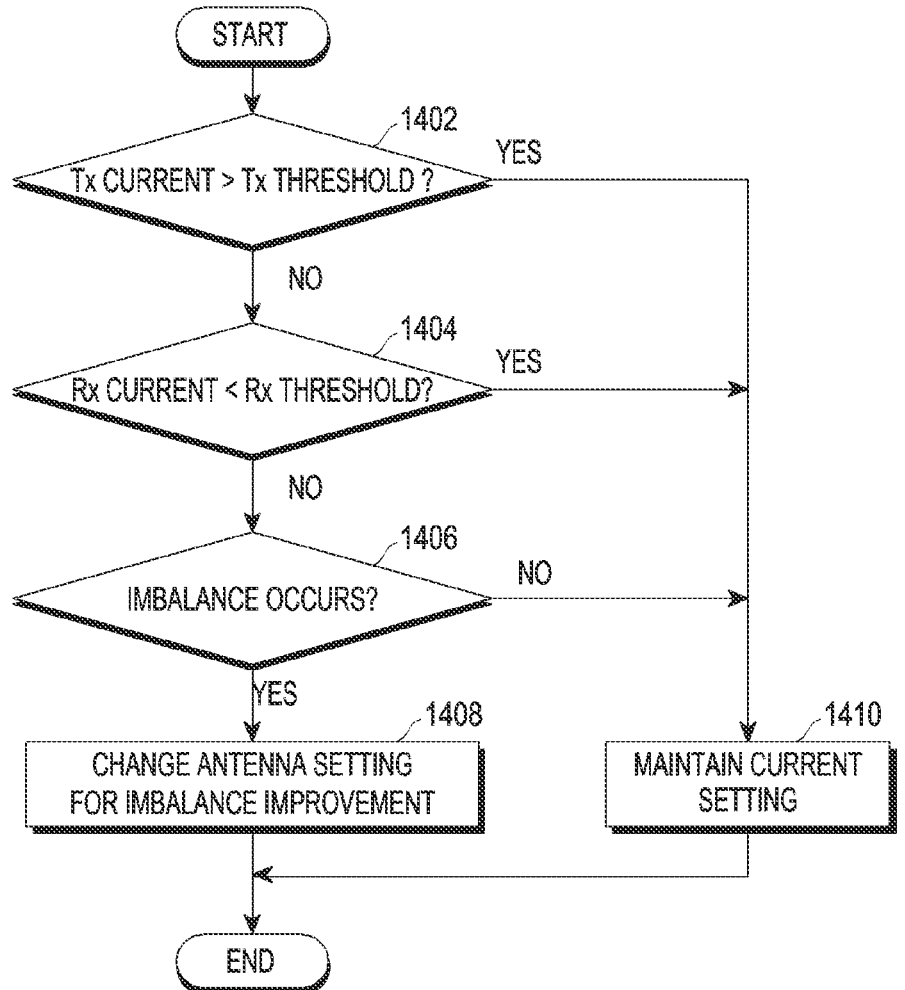
FIG. 14 is a flowchart illustrating a method of operating the electronic device according to various embodiments.

FIG. 14 is a flowchart illustrating a method of operating the electronic device according to various embodiments. Referring to FIG. 14, an electronic device (e.g., electronic device 101) may include multiple antennas (e.g., antenna module 197, first antenna module 242, second antenna module 244, third antenna module 246, first antenna 441, second antenna 442, third antenna 443, fourth antenna 444, and fifth antenna 445), at least one antenna tuning circuit (e.g., first antenna tuning circuit 441a, second antenna tuning circuit 442a, and third antenna tuning circuit 443a) connected to at least one antenna among the multiple antennas, and at least one communication processor (e.g., wireless communication module 192, first communication processor 212, second communication processor 214, and integrated communication processor 260).

According to various embodiments, an electronic device (e.g., communication processor) may determine whether a strength (Tx Current) of a transmission signal exceeds a set threshold (Tx Threshold) (e.g., first threshold value), in operation 1402. When the strength (Tx Current) of the transmission signal exceeds the set threshold value (Tx Threshold), the electronic device may determine that an electric field state of the transmission signal is not good. As a result of the determination in operation 1402, when the strength (Tx Current) of the transmission signal exceeds the threshold value (Tx Threshold) (Yes in operation 1402), the electronic device may maintain the setting of the antenna tuning circuit in a current state, in operation 1410.

According to various embodiments, as a result of the determination in operation 1402, when the strength (Tx Current) of the transmission signal does not exceed the threshold value (Tx Threshold) (No in operation 1402), the electronic device may determine whether a strength (Rx Current) of a reception signal is less than a set threshold value (Rx Threshold) (e.g., second threshold), in operation 1404. When the strength (Rx Current) of the reception signal is less than the set threshold value (Rx Threshold), the electronic device may determine that an electric field state of the reception signal is not good. As a result of the determination in operation 1404, when the strength (Rx Current) of the reception signal is less than the set threshold value (Rx Threshold) (Yes in operation 1404), the electronic device may maintain the setting of the antenna tuning circuit in a current state, in operation 1410.

According to various embodiments, as a result of the determination in operation 1404, when the strength (Rx Current) of the reception signal is equal to or greater than the set threshold value (Rx Threshold) (No in operation 1404), the electronic device may determine whether imbalance occurs (e.g., whether an imbalance condition is satisfied), in operation 1406. The embodiments described in FIG. 8 may be applied to determination of whether the imbalance has occurred, and a detailed description thereof may not be repeated here.

According to various embodiments, as a result of the determination in operation 1406, when the set imbalance condition is satisfied and it is thus determined that imbalance has occurred (Yes in operation 1406), the electronic device may change the setting of the antenna tuning circuit to a setting for imbalance improvement in order to improve the imbalance state of operation 1406 even though the transmission signal and the reception signal are both in a good state. For example, in operation 1408, the electronic device may change the setting of the antenna tuning circuit from a first setting value that is the current setting to a second setting value for imbalance improvement. According to various embodiments, the aforementioned embodiment of FIG. 14 may be applied to an electronic device that performs an open loop control of an antenna tuning circuit, but is not limited thereto.

FIG. 15A and FIG. 15B are graphs illustrating a range of a tuning circuit setting value according to a change of headroom for each antenna according to various embodiments. Referring to FIG. 15A and FIG. 15B, when a band having high priority is operating in a "Tx only mode", an "Rx only mode", or a "Tx/Rx Balanced mode", when an imbalance condition is satisfied, a Tx headroom may be increased. For example, in a situation where the electronic device operates in EN-DC of B13+N66, imbalance may occur in an NR reception signal. When B13 operates in the "Tx only mode", the electronic device may increase headroom of B13 and may determine a setting of an antenna tuning circuit of N66 within a range that satisfies the headroom. Referring to FIG. 15A and FIG. 15B, when imbalance occurs in a state where headroom of PCC Tx/Rx is set to 3 dB, the headroom 1510 of the PCC Tx/Rx may be increased to 5 dB as described above. As the headroom 1510 of the PCC Tx/Rx increases from 3 dB to 5 dB, a selection range 1511 of a tuner setting value of SCC Rx is widened, so that an imbalance problem may be solved. <Table 5> below shows an example in which imbalance is improved by changing the setting of the antenna tuning circuit in a state where the headroom is increased.

TABLE 5

| Sensitivity change by | B13 | | N66 | |
|---|---|---|---|---|
| code (N66 Imbalance) | RX0 | RX1 | RX0 | RX1 |
| 472A 0280 6980 | −90.1 | −89.8 | −88 | −93.5 |
| 602A 0280 6980 | −88 | −89.5 | −91 | −93 |

According to various embodiments, when the headroom is increased as illustrated in FIG. 15B, a tuner setting range for SCC Rx is widened, and imbalance may be thus improved, as shown in <Table 6> below.

TABLE 6

| Band | Channel | Imp Scn | Tx Pwr | | Band | Channel | Imp Scn | RX_LEVEL_DBM |
|---|---|---|---|---|---|---|---|---|
| 13 | 23230 | 113 | 21.64 | | 66 | 132322 | 19 | −61.7 |
| 13 | 23230 | 13 | 21.64 | | 66 | 132322 | 20 | −62 |
| 13 | 23230 | 105 | 21.6 | | 66 | 132322 | 71 | −62.1 |
| 13 | 23230 | 116 | 21.58 | | 66 | 132322 | 27 | −62.2 |
| 13 | 23230 | 52 | 21.44 | 1 dB | 66 | 132322 | 1 | −62.3 |
| 13 | 23230 | 67 | 19.8 | | 66 | 132322 | 16 | −62.5 |
| 13 | 23230 | 68 | 19.79 | | 66 | 132322 | 73 | −62.7 |
| 13 | 23230 | 93 | 19.76 | | 66 | 132322 | 10 | −62.7 |
| 13 | 23230 | 92 | 19.75 | | 66 | 132322 | 72 | −62.8 |
| 13 | 23230 | 57 | 19.73 | | 66 | 132322 | 26 | −62.9 |
| 13 | 23230 | 7 | 19.68 | | 66 | 132322 | 23 | −62.9 |
| 13 | 23230 | 41 | 19.65 | 2 dB | 66 | 132322 | 18 | −63.1 |
| 13 | 23230 | 38 | 19.6 | | 66 | 132322 | 21 | −63.2 |
| 13 | 23230 | 30 | 19.56 | | 66 | 132322 | 17 | −63.2 |
| 13 | 23230 | 8 | 19.54 | | 66 | 132322 | 15 | −63.2 |
| 13 | 23230 | 2 | 19.53 | | 66 | 132322 | 50 | −63.3 |
| 13 | 23230 | 39 | 19.52 | | 66 | 132322 | 83 | −63.4 |
| 13 | 23230 | 40 | 19.51 | | 66 | 132322 | 74 | −63.4 |
| 13 | 23230 | 35 | 19.45 | | 66 | 132322 | 65 | −63.5 |
| 13 | 23230 | 6 | 19.44 | | 66 | 132322 | 25 | −63.5 |
| 13 | 23230 | 42 | 19.42 | | 66 | 132322 | 54 | −63.6 |
| 13 | 23230 | 9 | 19.42 | | 66 | 132322 | 37 | −63.6 |
| 13 | 23230 | 36 | 19.41 | | 66 | 132322 | 24 | −63.6 |
| 13 | 23230 | 5 | 19.33 | | 66 | 132322 | 66 | −63.8 |
| 13 | 23230 | 32 | 19.24 | | 66 | 132322 | 62 | −63.8 |
| 13 | 23230 | 33 | 19.04 | | 66 | 132322 | 80 | −64 |
| 13 | 23230 | 4 | 19.02 | | 66 | 132322 | 91 | −64.1 |
| 13 | 23230 | 0 | 18.87 | | 66 | 132322 | 69 | −64.2 |
| 13 | 23230 | 46 | 18.79 | | 66 | 132322 | 63 | −64.3 |
| 13 | 23230 | 34 | 18.78. | 3 dB | 66 | 132322 | 77 | −66.3 |
| 13 | 23230 | 84 | 18.17. | | 66 | 132322 | 75 | −66.4 |
| 13 | 23230 | 45 | 18.17 | | 66 | 132322 | 61 | −66.4 |
| 13 | 23230 | 3 | 18.01 | | 66 | 132322 | 33 | −66.4 |
| 13 | 23230 | 82 | 17.87 | | 66 | 132322 | 8 | −66.4 |
| 13 | 23230 | 43 | 17.83 | | 66 | 132322 | 59 | −66.5 |
| 13 | 23230 | 83 | 16.82 | | 66 | 132322 | 70 | −66.7 |
| 13 | 23230 | 86 | 16.67 | | 66 | 132322 | 28 | −67.3 |
| 13 | 23230 | 44 | 16.66 | | 66 | 132322 | 52 | −68.1 |
| 13 | 23230 | 85 | 16.62 | 5 dB | 66 | 132322 | 13 | −68.3 |

Referring to <Table 6>, a setting value (code) of the antenna tuning circuit of B66 may be found within values obtained when the headroom of B13 is 3 dB. For example, when an impedance scenario (Imp Scn) of B13 4 is #33, a maximum transmission power of B13 is 19.04 dBm, and in this case, a reception signal sensitivity of B66 may be measured as −66.4 dBm. According to various embodiments, when the Tx headroom of B13 is changed from 3 dB to 5 dB, impedance scenario #83 becomes available, and Tx performance of B13 may be reduced from 19.04 dBm to 16.82 dBm. On the other hand, the reception signal sensitivity of B66 may be improved by 3 dB from −66.4 dBm to 63.4 dBm.

Figures 16A, 16B:
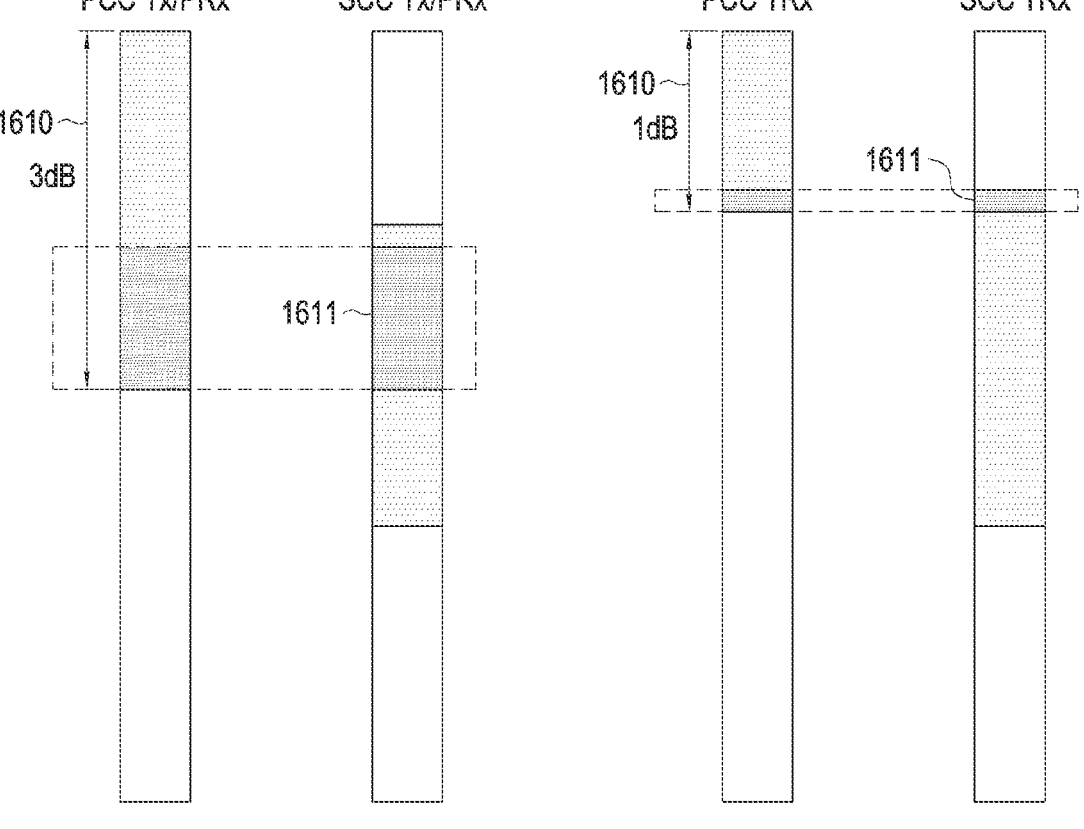
FIG. 16A and FIG. 16B are graphs illustrating a range of a tuning circuit setting value according to a change of headroom for each antenna according to various embodiments.

FIG. 16A and FIG. 16B are graphs illustrating a range of a tuning circuit setting value according to a change of headroom for each antenna according to various embodiments. According to various embodiments, when imbalance occurs in a band having highest priority, and a band having relatively low priority is operating in a "Tx only mode", an "Rx only mode", or a "Tx/Rx Balanced mode", in a case of PCC imbalance, headroom 1610 of B13 is further narrowed down from 3 dB to 1 dB as illustrated in FIG. 16A and FIG. 16B, so that even if a turner setting range 1611 for SCC Rx becomes narrow, the imbalance of PCC may be reduced.

An electronic device (e.g., electronic device 101) according to various embodiments may include multiple antennas (e.g., antenna module 197, first antenna module 242, second antenna module 244, third antenna module 246, first antenna 441, second antenna 442, third antenna 443, fourth antenna 444, and fifth antenna 445), at least one antenna tuning circuit (e.g., first antenna tuning circuit 441a, second antenna tuning circuit 442a, and third antenna tuning circuit 443a) connected to at least one antenna among the multiple antennas, and at least one communication processor (e.g., wireless communication module 192, first communication processor 212, second communication processor 214, and integrated communication processor 260), wherein the at least one communication processor is configured to receive, through a first antenna among the multiple antennas, a signal transmitted from a base station based on multiple-input and multiple-output (MIMO), receive, through a second antenna among the multiple antennas, a signal transmitted from the base station based on the MIMO, and based on a strength of a first signal received through the first antenna or a strength of a second signal received through the second antenna being equal to or greater than a first threshold value, determine whether an imbalance condition of the first signal and the second signal is satisfied, and adjust, based on the imbalance condition being satisfied, a setting value of the at least one antenna tuning circuit to reduce a difference between the strength of the first signal and the strength of the second signal.

According to various embodiments, the strength of the first signal or the strength of the second signal may include any one selected from a reference signal received power (RSRP), a received strength signal indicator (RSSI), a reference signal received quality (RSRQ), a received signal code power (RSCP), a signal to noise ratio (SNR), or a signal to interference plus noise ratio (SINR).

According to various embodiments, the at least one communication processor may be configured to determine that the imbalance condition is satisfied based on a difference between an RSRP of the first signal and an RSRP of the second signal being equal to or greater than a second threshold.

According to various embodiments, the at least one communication processor may be configured to determine that the imbalance condition is satisfied based on a difference between an SNR of the first signal and an SNR of the second signal being equal to or greater than a third threshold.

According to various embodiments, the at least one communication processor may be configured to determine whether the imbalance condition is satisfied based on the electronic device operating in multiple-input and multiple-output (MIMO) using the multiple antennas.

According to various embodiments, the at least one communication processor may be configured to determine that the imbalance condition is satisfied based on information corresponding to a rank smaller than a rank for the MIMO set in the electronic device being reported to the base station.

According to various embodiments, the at least one communication processor may be configured to determine that the imbalance condition is satisfied based on a layer assigned to the electronic device supporting a sounding reference signal (SRS) being smaller than a set layer.

According to various embodiments, the at least one communication processor may be configured to adjust, based on the imbalance condition being satisfied, a mode set for the at least one antenna tuning circuit from a first mode to a second mode so as to reduce the difference between the strength of the first signal and the strength of the second signal.

According to various embodiments, the first mode or the second mode may include any one selected from a mode in which transmission performance of at least one antenna among the multiple antennas is set to be maximum, a mode in which reception performance of at least one antenna among the multiple antennas is set to be maximum, and a mode in which transmission performance is set to a setting value having best reception performance from among setting values within a set range.

According to various embodiments, the at least one communication processor may be configured to identify a third signal transmitted through the first antenna among the multiple antennas, and may determine whether the imbalance condition is satisfied based on a strength of the third signal being equal to or less than a fourth threshold value.

A method according to various embodiments, which corresponds to a method for controlling a setting of an antenna in an electronic device including multiple antennas (e.g., antenna module 197, first antenna module 242, second antenna module 244, third antenna module 246, first antenna 441, second antenna 442, third antenna 443, fourth antenna 444, and fifth antenna 445), at least one antenna tuning circuit (e.g., first antenna tuning circuit 441a, second antenna tuning circuit 442a, and third antenna tuning circuit 443a) connected to at least one antenna among the multiple antennas, and at least one communication processor (e.g., wireless communication module 192, first communication processor 212, second communication processor 214, and integrated communication processor 260), may include receiving, through a first antenna among the multiple antennas, a signal transmitted from a base station based on multiple-input and multiple-output (MIMO), receiving, through a second antenna among the multiple antennas, a signal transmitted from the base station based on the MIMO, and based on a strength of a first signal received through the first antenna or a strength of a second signal received through the second antenna being equal to or greater than a first threshold value, determining whether an imbalance condition of the first signal and the second signal is satisfied, and adjusting, based on the imbalance condition being satisfied, a setting value of the at least one antenna tuning circuit so as to reduce a difference between the strength of the first signal and the strength of the second signal.

According to various embodiments, the strength of the first signal or the strength of the second signal may include any one selected from a reference signal received power (RSRP), a received strength signal indicator (RSSI), a reference signal received quality (RSRQ), a received signal code power (RSCP), a signal to noise ratio (SNR), or a signal to interference plus noise ratio (SINR).

According to various embodiments, the method may include determining that the imbalance condition is satisfied based on a difference between an RSRP of the first signal and an RSRP of the second signal being equal to or greater than a second threshold.

According to various embodiments, the method may include determining that the imbalance condition is satisfied based on a difference between an SNR of the first signal and an SNR of the second signal being equal to or greater than a third threshold.

According to various embodiments, the method may include determining whether the imbalance condition is satisfied based on the electronic device operating in multiple-input and multiple-output (MIMO) using the multiple antennas.

According to various embodiments, the method may include determining that the imbalance condition is satisfied based on information corresponding to a rank smaller than a rank for the MIMO set in the electronic device being reported to the base station.

According to various embodiments, the method may include determining that the imbalance condition is satisfied based on a layer assigned to the electronic device supporting a sounding reference signal (SRS) being smaller than a set layer.

According to various embodiments, the method may include adjusting, based on the imbalance condition being satisfied, a mode set for the at least one antenna tuning circuit from a first mode to a second mode so as to reduce the difference between the strength of the first signal and the strength of the second signal.

According to various embodiments, the first mode or the second mode may include any one selected from a mode in which transmission performance of at least one antenna among the multiple antennas is set to be maximum, a mode in which reception performance of at least one antenna among the multiple antennas is set to be maximum, and a mode in which transmission performance is set to a setting value having best reception performance from among setting values within a set range.

According to various embodiments, the at least one communication processor may further perform identifying a third signal transmitted through the first antenna among the multiple antennas, and determining whether the imbalance condition is satisfied based on a strength of the third signal being equal to or less than a fourth threshold value.

The electronic device according to various embodiments may be one of various types of electronic devices. The electronic devices may include, for example, a computer device, a portable communication device (e.g., a smartphone), a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semipermanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various embodiments, it will be understood that the various embodiments are intended to be illustrative, not limiting. It will be further understood by those skilled in the art that various changes in form and detail may be made without departing from the true spirit and full scope of the disclosure including the appended claims and their equivalents. It will also be understood that any of the embodiment(s) described herein may be used in conjunction with any other embodiment(s) described herein.

What is claimed is:

1. An electronic device comprising:
multiple antennas comprising a first antenna and a second antenna;
at least one antenna tuning circuit connected to at least one antenna among the first antenna and the second antenna;

at least one communication processor comprising processing circuitry; and memory storing instructions that, when executed by the at least one communication processor, cause the electronic device to:

receive, through the first antenna, a signal transmitted from a base station during a multiple-input and multiple-output (MIMO) operation, receive, through the second antenna, a signal transmitted from the base station during a MIMO operation, adjust, based on a strength of a first signal received through the first antenna being equal to or greater than a first threshold value and a difference between a signal to noise ratio (SNR) of the first signal and an SNR of a second signal received through the second antenna being equal to or greater than a second threshold, a tuner setting value of the at least one antenna tuning circuit corresponding to the first antenna and/or the second antenna to reduce the difference between the strength of the first signal and a strength of the second signal;

adjust, based on the strength of the signal transmitted through the first antenna being greater than a transmit threshold and the strength of the first signal received through the first antenna being less than the first threshold value, the tuner setting value of the at least one antenna tuning circuit corresponding to the first antenna and/or the second antenna to a setting value in which reception performance of at least one of the first antenna or the second antenna is maximized from among a set range; and adjust, based on the strength of the signal transmitted through the first antenna being greater than the transmit threshold, the strength of the first signal received through the first antenna being equal to or greater than the first threshold value and the difference between the SNR of the first signal and the SNR of the second signal received through the second antenna being less than the second threshold, the tuner setting value of the at least one antenna tuning circuit corresponding to the first antenna and/or the second antenna to a setting value in which transmission performance of at least one of the first antenna or the second antenna is set to be maximum.

2. The electronic device of claim 1, wherein the strength of the first signal or the strength of the second signal comprises any one selected from a reference signal received power (RSRP), a received strength signal indicator (RSSI), a reference signal received quality (RSRQ), a received signal code power (RSCP), a signal to noise ratio (SNR), or a signal to interference plus noise ratio (SINR).

3. The electronic device of claim 2, wherein the instructions, when executed by the at least one communication processor, further cause the electronic device to adjust the tuner setting value based on a difference between an RSRP of the first signal and an RSRP of the second signal being equal to or greater than a third threshold.

4. The electronic device of claim 1, wherein the instructions, when executed by the at least one communication processor, further cause the electronic device to adjust the tuner setting value based on the electronic device operating in MIMO using the multiple antennas.

5. The electronic device of claim 4, wherein the instructions, when executed by the at least one communication processor, further cause the electronic device to adjust the tuner setting value based on information corresponding to a rank smaller than a rank for the MIMO configured to the electronic device being reported to the base station.

6. The electronic device of claim 4, wherein the instructions, when executed by the at least one communication processor, further cause the electronic device to adjust the tuner setting value based on a layer assigned to the electronic device supporting a sounding reference signal (SRS) being smaller than a set layer.

7. The electronic device of claim 1, wherein the instructions, when executed by the at least one communication processor, further cause the electronic device to adjust a mode set for the at least one antenna tuning circuit from a first mode to a second mode so as to reduce the difference between the strength of the first signal and the strength of the second signal.

8. The electronic device of claim 7, wherein the first mode or the second mode comprises any one selected from a mode in which transmission performance of at least one antenna among the multiple antennas is set to be maximum, a mode in which reception performance of at least one antenna among the multiple antennas is set to be maximum, or a mode set to a setting value in which reception performance is set to be maximum from among setting values for which transmission performance belongs to a set range.

9. The electronic device of claim 7, wherein the first mode corresponds to a mode set to a setting value in which reception performance is set to be maximum from among setting values for which transmission performance belongs to a set range, and the second mode corresponds to a mode in which reception performance of at least one antenna among the multiple antennas is set to be maximum, and wherein the instructions, when executed by the at least one communication processor, further cause the electronic device to adjust the mode set for the at least one antenna tuning circuit from the first mode to the second mode so as to reduce the difference between the strength of the first signal and the strength of the second signal.

10. The electronic device of claim 1, wherein the instructions, when executed by the at least one communication processor, further cause the electronic device to:

adjust, based on the strength of the signal transmitted through the first antenna being equal to or less than the transmit threshold and the strength of the first signal received through the first antenna being less than the first threshold value, the tuner setting value of the antenna tuning circuit corresponding to the first antenna to a receive only mode.

11. The electronic device of claim 1, wherein the instructions, when executed by the at least one communication processor, further cause the electronic device to adjust the tuner setting value so as to reduce the difference between the strength of the first signal and the strength of the second signal by reducing the strength of the first signal.

12. A method for controlling a setting of an antenna in an electronic device comprising at least one communication processor, multiple antennas comprising a first antenna and a second antenna, and at least one antenna tuning circuit connected to at least one antenna among the first antenna and the second antenna, the method comprising:

receiving, through the first antenna, a signal transmitted from a base station during a multiple-input and multiple-output (MIMO) operation;

receiving, through the second antenna, a signal transmitted from the base station during a MIMO operation;

adjusting, based on a strength of a first signal received through the first antenna being equal to or greater than a first threshold value and a difference between a signal to noise ratio (SNR) of the first signal and an SNR of a second signal received through the second antenna being equal to or greater than a second threshold, a tuner setting value of the at least one antenna tuning circuit corresponding to the first antenna and/or the second antenna to reduce the difference between the strength of the first signal and a strength of the second signal;

adjusting, based on the strength of the signal transmitted through the first antenna being greater than a transmit threshold and the strength of the first signal received through the first antenna being less than the first threshold value, the tuner setting value of the at least one antenna tuning circuit corresponding to the first antenna and/or the second antenna to a setting value in which reception performance of at least one of the first antenna or the second antenna is maximized from among a set range; and adjusting, based on the strength of the signal transmitted through the first antenna being greater than the transmit threshold, the strength of the first signal received through the first antenna being equal to or greater than the first threshold value and the difference between the SNR of the first signal and the SNR of the second signal received through the second antenna being less than the second threshold, the tuner setting value of the at least one antenna tuning circuit corresponding to the first antenna and/or the second antenna to a setting value in which transmission performance of at least one of the first antenna or the second antenna is set to be maximum.

13. The method of claim 12, wherein the strength of the first signal or the strength of the second signal comprises any one selected from a reference signal received power (RSRP), a received strength signal indicator (RSSI), a reference signal received quality (RSRQ), a received signal code power (RSCP), a signal to noise ratio (SNR), or a signal to interference plus noise ratio (SINR).

14. The method of claim 13, comprising adjusting the tuner setting value based on a difference between an RSRP of the first signal and an RSRP of the second signal being equal to or greater than a third threshold.

15. The method of claim 12, comprising adjusting the tuner setting value based on the electronic device operating in MIMO using the multiple antennas.

16. The method of claim 15, comprising adjusting the tuner setting value based on information corresponding to a rank less than a rank for the MIMO configured to the electronic device being reported to the base station.

17. The method of claim 15, comprising adjusting the tuner setting value based on a layer assigned to the electronic device supporting a sounding reference signal (SRS) being less than a set layer.

18. The method of claim 12, comprising adjusting a mode set for the at least one antenna tuning circuit from a first mode to a second mode so as to reduce the difference between the strength of the first signal and the strength of the second signal.

19. The method of claim 18, wherein the first mode or the second mode comprises any one selected from a mode in which transmission performance of at least one antenna among the multiple antennas is set to be maximum, a mode in which reception performance of at least one antenna among the multiple antennas is set to be maximum, or a mode set to a setting value in which reception performance is set to be maximum reception performance from among setting values for which transmission performance belongs to a set range.

20. The method of claim 18, wherein the first mode corresponds to a mode set to a setting value in which reception performance is set to be maximum from among setting values for which transmission performance belongs to a set range, and the second mode corresponds to a mode in which reception performance of at least one antenna among the multiple antennas is set to be maximum, the method comprising adjusting the mode set for the at least one antenna tuning circuit from the first mode to the second mode so as to reduce the difference between the strength of the first signal and the strength of the second signal.

21. The method of claim 12, comprising, adjusting, based on the strength of the signal transmitted through the first antenna being equal to or less than the transmit threshold and the strength of the first signal received through the first antenna being less than the first threshold value, the tuner setting value of the antenna tuning circuit corresponding to the first antenna to a receive only mode.

22. The method of claim 12, wherein the method comprising:

adjusting the tuner setting value so as to reduce the difference between the strength of the first signal and the strength of the second signal by reducing the strength of the first signal.

23. A non-transitory computer readable medium having instructions stored therein, which when executed by at least one communication processor cause an electronic device to execute a method of controlling the electronic device, the method comprising:

receiving, through a first antenna among multiple antennas, a signal transmitted from a base station during a multiple-input and multiple-output (MIMO) operation;

receiving, through a second antenna among the multiple antennas, a signal transmitted from the base station during a MIMO operation;

adjusting, based on a strength of a first signal received through the first antenna being equal to or greater than a first threshold value and a difference between a signal to noise ratio (SNR) of the first signal and an SNR of a second signal received through the second antenna being equal to or greater than a second threshold, a tuner setting value of at least one antenna tuning circuit corresponding to the first antenna or the second antenna to reduce the difference between the strength of the first signal and a strength of the second signal;

adjusting, based on the strength of the signal transmitted through the first antenna being greater than a transmit threshold and the strength of the first signal received through the first antenna being less than the first threshold value, the tuner setting value of the at least one antenna tuning circuit corresponding to the first antenna and/or the second antenna to a setting value in which reception performance of at least one of the first antenna or the second antenna is maximized from among a set range; and adjusting, based on the strength of the signal transmitted through the first antenna being greater than the transmit threshold, the strength of the first signal received through the first antenna being equal to or greater than the first threshold value and the difference between the SNR of the first signal and the SNR of the second signal received through the second antenna being less than the second threshold, the tuner setting value of the at least one antenna tuning circuit corresponding to the first antenna and/or the second antenna to a setting value in which transmission performance of at least one of the first antenna or the second antenna is set to be maximum.

* * * * *